(12) United States Patent
Grau Besoli et al.

(10) Patent No.: US 8,836,574 B2
(45) Date of Patent: *Sep. 16, 2014

(54) INTEGRATED AND CONFIGURABLE RADAR SYSTEM

(71) Applicant: Broadcom Corporation, Irvine, CA (US)

(72) Inventors: Alfred Grau Besoli, Barcelona (ES); Nicolaos G. Alexopoulos, Irvine, CA (US); Jesus Alfonso Castaneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/930,327

(22) Filed: Jun. 28, 2013

(65) Prior Publication Data

US 2013/0285848 A1    Oct. 31, 2013

Related U.S. Application Data

(63) Continuation of application No. 12/869,463, filed on Aug. 26, 2010, now Pat. No. 8,487,810.

(60) Provisional application No. 61/243,001, filed on Sep. 16, 2009.

(51) Int. Cl.

| | |
|---|---|
| *G01S 13/00* | (2006.01) |
| *H01Q 3/40* | (2006.01) |
| *H01Q 3/30* | (2006.01) |
| *G01S 13/42* | (2006.01) |
| *G01S 13/72* | (2006.01) |
| *G01S 13/87* | (2006.01) |
| *G01S 7/03* | (2006.01) |
| *H01Q 3/24* | (2006.01) |
| *H01Q 1/52* | (2006.01) |

(52) U.S. Cl.
CPC .............. *G01S 13/428* (2013.01); *H01Q 3/40* (2013.01); *H01Q 3/30* (2013.01); *G01S 13/72* (2013.01); *G01S 13/87* (2013.01); *G01S 7/03* (2013.01); *H01Q 3/24* (2013.01); *H01Q 1/525* (2013.01)
USPC ......................................... 342/133; 342/165

(58) Field of Classification Search
USPC ................... 342/147, 127, 134, 146
See application file for complete search history.

(56) References Cited

U.S. PATENT DOCUMENTS

| | | | | |
|---|---|---|---|---|
| 5,381,156 | A * | 1/1995 | Bock et al. ................... | 342/126 |
| 5,818,383 | A * | 10/1998 | Stockburger et al. ......... | 342/109 |
| 6,335,700 | B1 * | 1/2002 | Ashihara ......................... | 342/70 |
| 8,487,810 | B2 * | 7/2013 | Grau Besoli et al. ......... | 342/134 |
| 2003/0222778 | A1 * | 12/2003 | Piesinger ....................... | 340/541 |
| 2006/0166681 | A1 * | 7/2006 | Lohbihler .................. | 455/456.2 |
| 2010/0127916 | A1 * | 5/2010 | Sakai et al. .................... | 342/135 |

* cited by examiner

*Primary Examiner* — Timothy A Brainard

(74) *Attorney, Agent, or Firm* — Garlick & Markison; Bruce E. Garlick

(57) ABSTRACT

An integrated radar system includes a processing module and a radar device. The radar device includes an antenna module, a configurable shaping module, and a configurable transceiver module. The processing module generates an outbound signal and a control signal to configure the integrated radar system. The configured transceiver module converts the outbound signal into an outbound wireless signal. The configured shaping module shapes the outbound wireless signal into a shaped signal. The antenna module transmits the shaped signal and then receives an inbound radar signal. The configured shaping module shapes the inbound radar signal into an inbound wireless signal. The configured transceiver module converts the inbound wireless signal into an inbound symbol stream. The processing module determines location information regarding an object based on the inbound symbol stream.

20 Claims, 17 Drawing Sheets

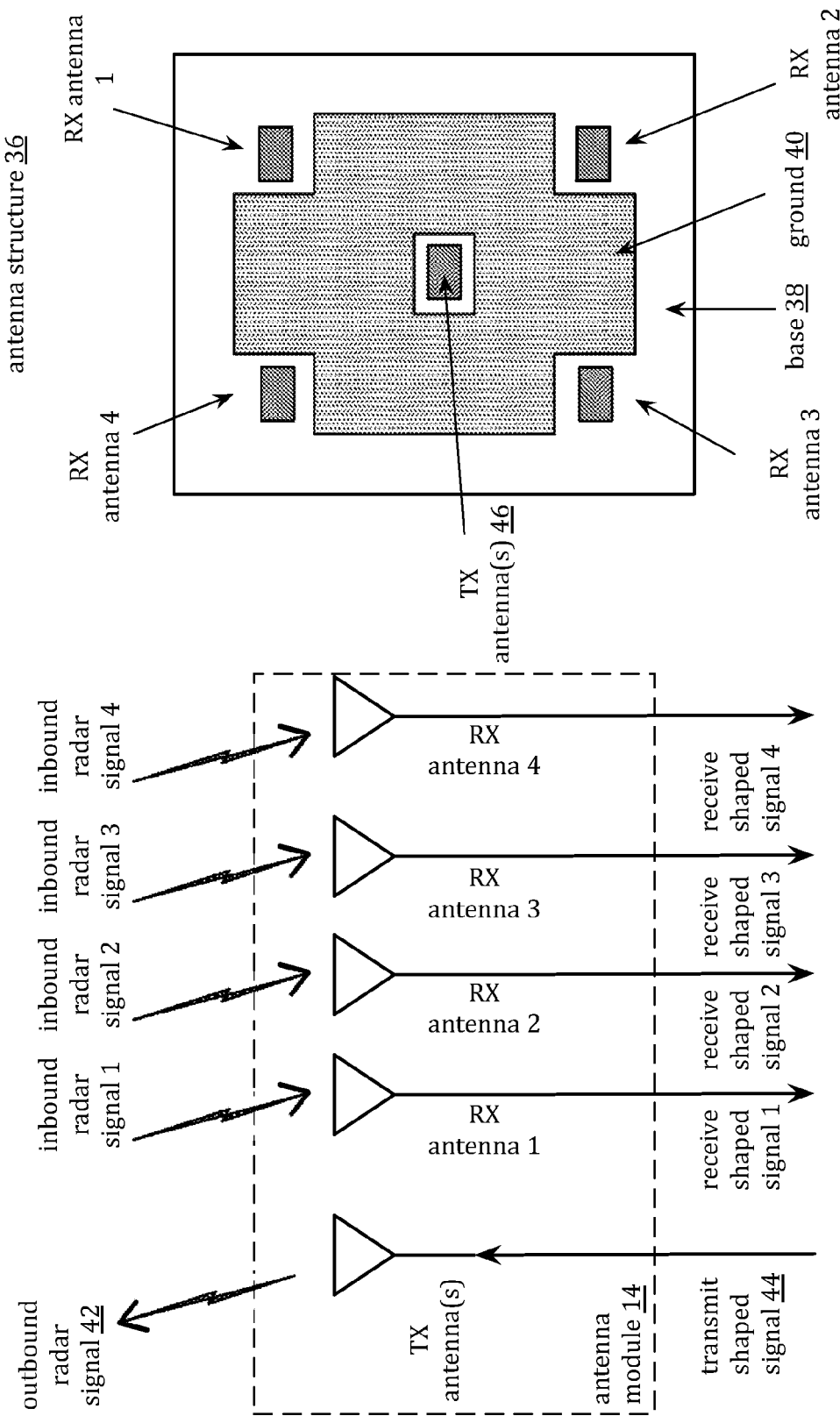

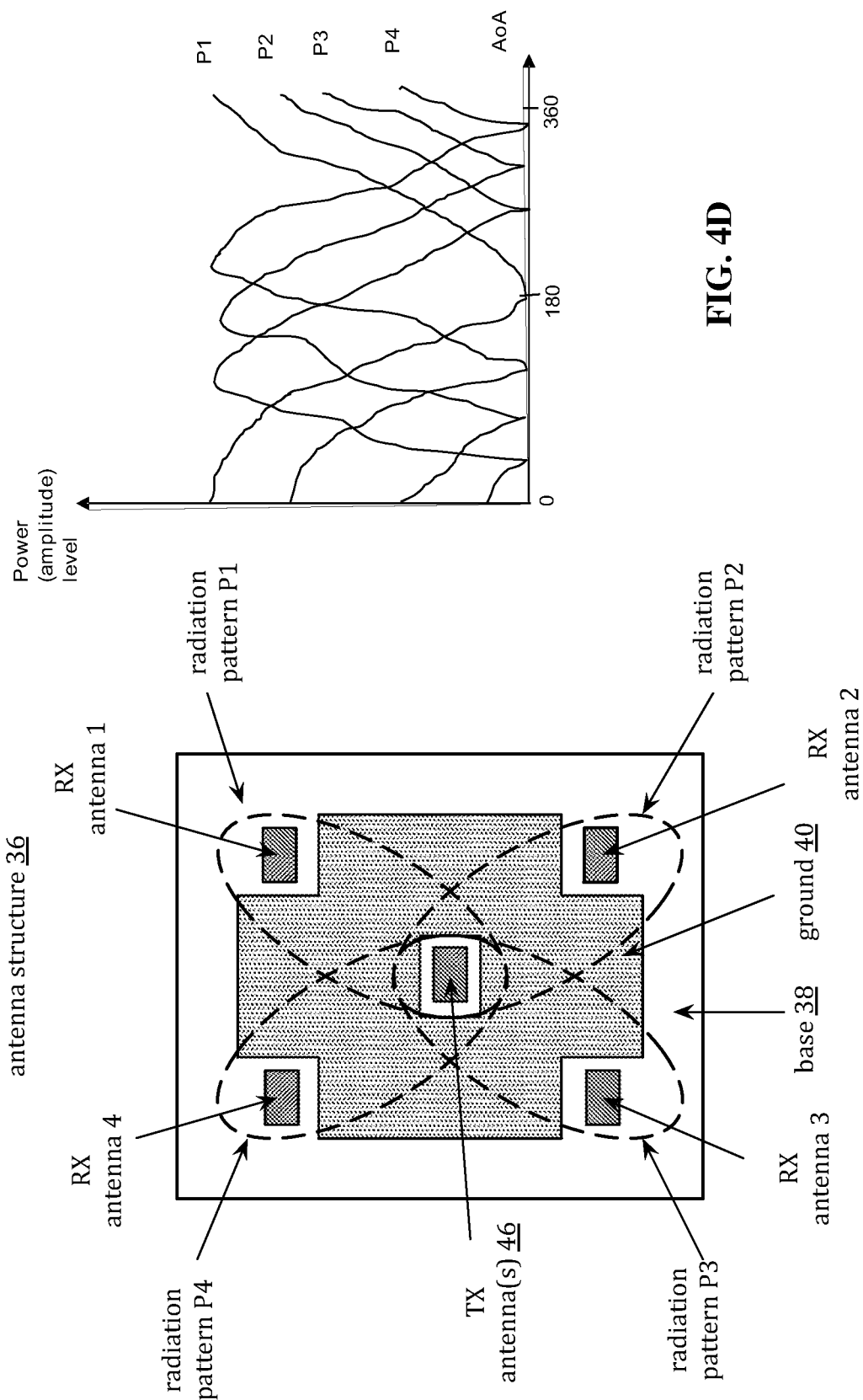

configurable antenna 62

INTEGRATED AND CONFIGURABLE RADAR SYSTEM

CROSS REFERENCE TO RELATED PATENTS

The present U.S. Utility patent application claims priority pursuant to 35 U.S.C. §120, as a continuation of U.S. Utility patent application Ser. No. 12/869,463, filed on Aug. 26, 2010, issuing as U.S. Pat. No. 8,487,810, which is incorporated herein by reference in its entirety for all purposes.

The Ser. No. 12/869,463 application claims priority under 35 U.S.C. §119(e) to U.S. Provisional Patent Application No. 61/243,001, filed on Sep. 16, 2009, which is incorporated herein by reference in its entirety for all purposes.

BACKGROUND OF THE INVENTION

1. Technical Field of the Invention

This invention relates generally to communication systems and more particularly to radar systems.

2. Description of Related Art

Radar systems are known to determine relative location information concerning one or more objects within a scanning area. Such radar systems range from ground based radar systems that track objects in space in various earth orbits, to radar that tracks aircraft, to radar that tracks weather systems, to police radar that tracks vehicle velocity, to moving radar on a vehicle to track other vehicles within a proximal area. Each type of radar system is constructed to illuminate the scanning area with transmitted wireless pulsed or continuous signals and to analyze the resulting reflected wireless signals to detect objects and determine the location information. Time based location information and/or Doppler shift analysis may reveal velocity information. The wireless signals may include radio signals and/or light (e.g., laser) that suites the application. For instance, radio frequency (RF) wireless radar systems may operate at 50 MHz for long distance radar, at 2 GHz for tracking aircraft in the sky, at 7 GHz for tracking weather, at 10 GHz for aircraft near an airport, at 24 GHz for tracking vehicles on roadways, and other higher frequencies including light for specialized applications.

Depending on the type of radar system, the antenna system may mechanically move or may be electronically steered to transmit and or receive the radar signals in a particular direction within the scanning area. For instance, the weather radar system may utilize one common directional dish antenna to transmit and receive radar signals where the antenna is mechanically rotated fully to scan 360 degrees of azimuth. In another instance, an aircraft tracking radar may utilize a common phased array antenna system comprised of a plurality of antenna elements fed with radar signals produced by phasing equipment where the radar signals are phased in a way to produce transmit and or receive antenna pattern beams.

As is also known, typical radar systems utilize antenna structures, phasing equipment, and transceivers that are discrete, bulky, and costly thus rendering them difficult to adapt for certain applications. For instance, many prior art radar system are not particularly well suited for vehicular based radar for applications such as vehicle collision warning, lane change warning, and/or lane departure due to their size and cost.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 4A is a schematic block diagram of another embodiment of an antenna module in accordance with the present invention;

FIG. 4B is a schematic block diagram of another embodiment of an antenna structure in accordance with the present invention;

FIG. 4C is a schematic block diagram of another embodiment of an antenna structure in accordance with the present invention;

FIG. 4D is a graphic representation of power and angle of arrival of another embodiment of an antenna structure in accordance with the present invention;

DETAILED DESCRIPTION OF THE INVENTION

Figure 1:
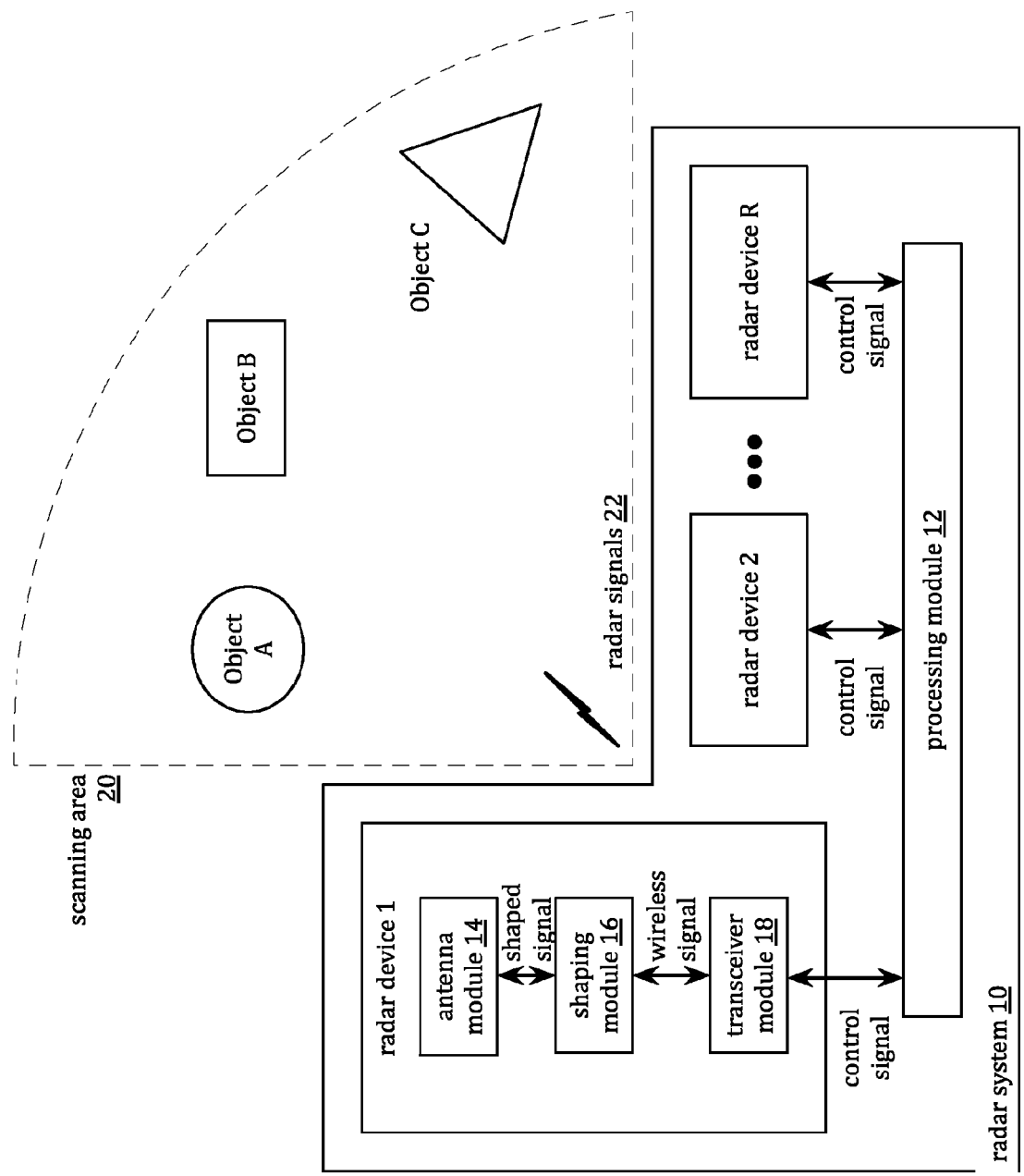
FIG. 1 is a schematic block diagram of an embodiment of a radar system in accordance with the present invention.

FIG. 1 is a schematic block diagram of an embodiment of a radar system 10 that includes one or more radar devices 1-R, and a processing module 12. The radar system 10 may be fixed or portable. For example, the radar system 10 may be in the fixed configuration when it detects player movements of a gaming system in a room. In another example, the radar system 10 may be in the portable configuration when it detects vehicles around a vehicle equipped with the radar system 10. Fixed radar system applications also include radar for weather, control tower based aircraft tracking, manufacturing line material tracking, and security system motion sensing. Portable radar system applications also include vehicular safety applications (e.g., collision warning, collision avoidance, adaptive cruise control, lane departure warning), aircraft based aircraft tracking, train based collision avoidance, and golf cart based golf ball tracking.

Each of the radar devices 1-R includes an antenna module 14, a shaping module 16, and a transceiver module 18. The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 12 may have an associated memory and/or memory element, which may be a single memory device, a plurality of memory devices, and/or embedded circuitry of the processing module 12. Such a memory device may be a read-only memory, random access memory, volatile memory, non-volatile memory, static memory, dynamic memory, flash memory, cache memory, and/or any device that stores digital information. Note that if the processing module 12 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 12 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 12 executes, hard coded and/or operational instructions corresponding to at least some of the steps and/or functions illustrated in FIGS. 1-13.

In an example of operation, the radar system 10 functions to detect location information regarding objects (e.g., object A, B, and/or C) in its scanning area 20. The location information may be expressed in two dimensional or three dimensional terms and may vary with time (e.g., velocity and acceleration). The location information may be relative to the radar system 10 or it may be absolute with respect to a more global reference (e.g., longitude, latitude, elevation). For example, relative location information may include distance between the object and the radar system 10 and/or angle between the object and the radar system 10.

The scanning area 20 includes the radiation pattern of each of the radar devices 1-R. For example, each radar device 1-R transmits and receives radar signals 22 over the entire scanning area 20. In another example, each radar device 1-R transmits and receives radar signals 22 to R unique portions of the scanning area 20 with substantially no overlap of their radiation patterns. In yet another example, some radar devices 1-R have overlapping radiation patterns while others do not.

The radar system 10 may detect objects and determine the location information in a variety of ways in a variety of frequency bands. The radar devices 1-R may operate in the 60 GHz band or any other band in the 30 MHz to 300 GHz range as a function of coverage optimization and system design goals to meet the needs of a particular application. For example, 50 MHz is utilized to penetrate the atmosphere to scan objects in earth orbit while 60 GHz can be utilized to scan for vehicles one to three car lengths from a radar equipped vehicle where the atmospheric effects are minimal. The radar devices 1-R operate in the same or different frequency ranges.

The location information may be determined by the radar system 10 when the radar system 10 is operating in different modes including one or more of each radar device 1-R operating independently, two or more radar devices 1-R operating collectively, continuous wave (CW) transmission, pulse transmission, separate transmit (TX) and receive (RX) antennas, and shared transmit (TX) and receive (RX) antennas. The radar devices 1-R may operate under the control of the processing module 12 to configure the radar devices 1-R to operate in accordance with the operating mode.

For example, in a pulse transmission mode, the processing module 12 sends a control signal to the radar device 1-R to configure the mode and operational parameters (e.g., pulse transmission, 60 GHz band, separate transmit (TX), and receive (RX) antennas, work with other radar devices 1-R). The control signal includes operational parameters for each of the transceiver module 18, the shaping module 16, and the antenna module 14. The transceiver 18 receives the control signal and configures the transceiver 18 to operate in the pulse transmission mode in the 60 GHz band.

The transceiver module 18 may include one or more transmitters and/or one or more receivers. The transmitter generates an outbound wireless signal based on an outbound control signal from the processing module 12. The outbound control signal includes control information to operate any portion of the radar device and may contain an outbound message (e.g., a time stamp) to embed in the outbound radar signal 22. Note that the time stamp can facilitate determining location information for the CW mode or pulse mode.

In the example, the transceiver 18 generates a pulse transmission mode outbound wireless signal and sends it to the shaping module 16. Note that the pulse transmission mode outbound wireless signal may include a single pulse, and/or a series of pulses (e.g., pulse width less than 1 nanosecond every millisecond to once every few seconds). The outbound radar signal 22 may include a time stamp message of when it is transmitted. For example, the transceiver 18 converts the time stamp message into an outbound symbol stream and converts the outbound symbol stream into an outbound wireless signal. As another example, the processing module 12 converts the outbound message into the outbound symbol stream.

The shaping module 16 receives the control signal (e.g., in the initial step from the processing module) and configures to operate with the antenna module 14 with separate transmit (TX) and receive (RX) antennas. The shaping module 16 produces one or more transmit shaped signals for the antenna module 14 based on the outbound wireless signal from the transceiver 18 and on the operational parameters based on one or more of the outbound control signal from the processing module 12 and/or operational parameters from the transceiver 18. The shaping module 16 may produce the one or more transmit shaped signals by adjusting the amplitude and phase of outbound wireless signal differently for each of the one or more transmit shaped signals.

The radar device antenna module 14 radiates the outbound radar signal 22 creating a transmit pattern in accordance with the operational parameters and mode within the scanning area 20. The antenna module 14 may include one or more antennas. Antennas may be shared for both transmit and receive operations. Note that in the example, separate antennas are utilized for TX (e.g., in the radar device) and RX (e.g., in a second radar device).

Antenna module 14 antennas may include any mixture of designs including monopole, dipole, horn, dish, patch, microstrip, isotron, fractal, yagi, loop, helical, spiral, conical, rhombic, j-pole, log-periodic, slot, turnstile, collinear, and nano. Antennas may be geometrically arranged such that they form a phased array antenna when combined with the phasing capabilities of the shaping module 16. The radar device 1-R may utilize the phased array antenna configuration as a transmit antenna system to transmit outbound radar signals as a transmit beam in a particular direction of interest. The antenna module 14 will be discussed in greater detail with reference to FIGS. 2-4, 9-13.

In the example, one or more of the radar devices receives an inbound radar signal 22 via its antenna module 14 that results from the outbound radar signal 22 reflecting, refracting, and being absorbed in part by the one or more objects (e.g., objects A, C, and/or C) in the scanning area 20. The radar device(s) utilize the phased array antenna configuration as a receive antenna system to receive inbound radar signals 22 to identify a direction of its origin (e.g., a radar signal reflection off an object at a particular angle of arrival).

The antenna module 14 of the radar device(s) sends the inbound radar signal 22 to its shaping module 16 as a shaped signal. The shaped signal may be the result of the inbound radar signal 22 impinging on one or more antennas that comprise the antenna module 14 (e.g., an array). For example, the amplitude and phase will vary slightly between elements of a phased array.

The shaping module 16 produces one or more inbound wireless signals for the transceiver 18 based on one or more receive shaped signals from the antenna module 14 and on the operational parameters from one or more of the processing module 12 and/or the transceiver 18. The shaping module 16 may produce the one or more inbound wireless signals by adjusting the amplitude and/or phase of one or more receive shaped signals differently for each of the one or more receive shaped signals. The shaping module 16 will be discussed in greater detail with reference to FIGS. 2-3, 5-8, 10A-13.

As a more specific example, the second radar device transceiver 18 generates an inbound control signal based on the inbound wireless signal from its shaping module 16. The inbound control signal may include the status of the operational parameters, inbound wireless signal parameters (e.g., amplitude information, timing information, phase information), and an inbound message decoded from the inbound wireless signal. The transceiver 18 converts the inbound wireless signal into an inbound symbol stream and converts the inbound symbol stream into the inbound message (e.g., to decode the time stamp). Note that the processing module 12 may be configured to convert the inbound symbol stream into the inbound message.

The processing module 12 determines location information about the object based on the inbound radar signal 22 received by the radar device 1-R. In particular, the processing module 12 determines the distance to the object based on the time stamp and the time at which the radar device 1-R received the inbound radar signal 22. Since the radar signals 22 travel at the speed of light, the distance can be readily determined.

In another example, where the mode is each radar device 1-R operating independently, each radar device 1-R transmits the outbound radar signal 22 to the scanning area 20 and each radar device 1-R receives the inbound radar signal 22 resulting from the reflections of the outbound radar signal 22 off the one or more objects. Each radar device 1-R utilizes its antenna module 14 to provide the processing module 12 with control signals that can reveal the location information of an object with reference to the radar device 1-R. For example, the processing module 12 determines the location of the object when two radar devices 1-R at a known distance apart provide control signals that reveal the angle of arrival of the inbound radar signal 22.

In another example of operation, the processing module 12 determines the operational parameters for radar devices 1 and 2 based on the requirements of the application (e.g., scanning area size and refresh rates of the location information). The processing module 12 sends the operational requirements to the radar devices (e.g., operate at 60 GHz, configure the transmit antenna of each radar device for an omni-directional pattern, transmit a time stamped 1 nanosecond pulse every 1 millisecond, sweep the scanning area 20 with a phased array antenna configuration in each radar device). The antenna module 14, the shaping module 16, and the transceiver 18 configure in accordance with the operational parameters. The receive antenna array may be initially configured to start at a default position (e.g., the far left direction of the scanning area).

The transceiver 18 generates the outbound wireless signal including the time stamped outbound message. The shaping module 16 passes the outbound wireless signal to the omni-directional transmit antenna where the outbound radar signal 22 is radiated into the scanning area 20. The inbound radar signal 22 is generated by a reflection off of object A. The receive antenna array captures the inbound radar signal 22 and passes the inbound wireless signal to the transceiver 18. The transceiver 18 determines the distance to object A based on the received time stamp message and the received time. The transceiver 18 forms the inbound control signal based on the determination of the amplitude of the inbound wireless signal for this pulse and sends the inbound control signal to the processing module 12 where it is saved for later comparison to similar data from subsequent pulses.

In the example, the transceiver module 18 and/or processing module 12 determines and sends updated operational parameters to the shaping module 16 to alter the pattern of the receive antenna array prior to transmitting the next outbound radar signal 22. The determination may be based on a predetermined list or may be based in part on an analysis of the received information so far (e.g., track the receive antenna pattern towards the object where the pattern yields a higher amplitude of the inbound wireless signal).

The above process is repeated until each radar device 1-R has produced an inbound wireless signal peak for the corresponding receive antenna array pattern. The processing module 12 determines the angle of arrival of the inbound radar signal 22 to each of the radar devices 1-R based on the receive antenna array settings (e.g., shaping module 16 operational parameters and antennas deployed). The processing module 12 determines the location information of object A based on the angle of arrival of the inbound radar signals 22 to the radar devices 1-R (e.g., where those lines intersect) and the distance and orientation of the radar devices 1-R to each other. The above process repeats until the processing module 12 has determined the location information of each object A, B, and C in the scanning area 20.

In an embodiment, the processing module 12, the transceiver 18, shaping module 16, and antenna module 14 may be implemented as one or more integrated circuits operating at 60 GHz, or other frequencies. As such, the compact packaging readily facilitates radar system 10 applications including player motion tracking for gaming consoles and vehicle tracking for vehicular-based anti-collision systems. The shaping module 16 and antenna module 14 together may form transmit and receive beams to more readily identify objects in the scanning area 20 and determine their location information.

Figure 2:
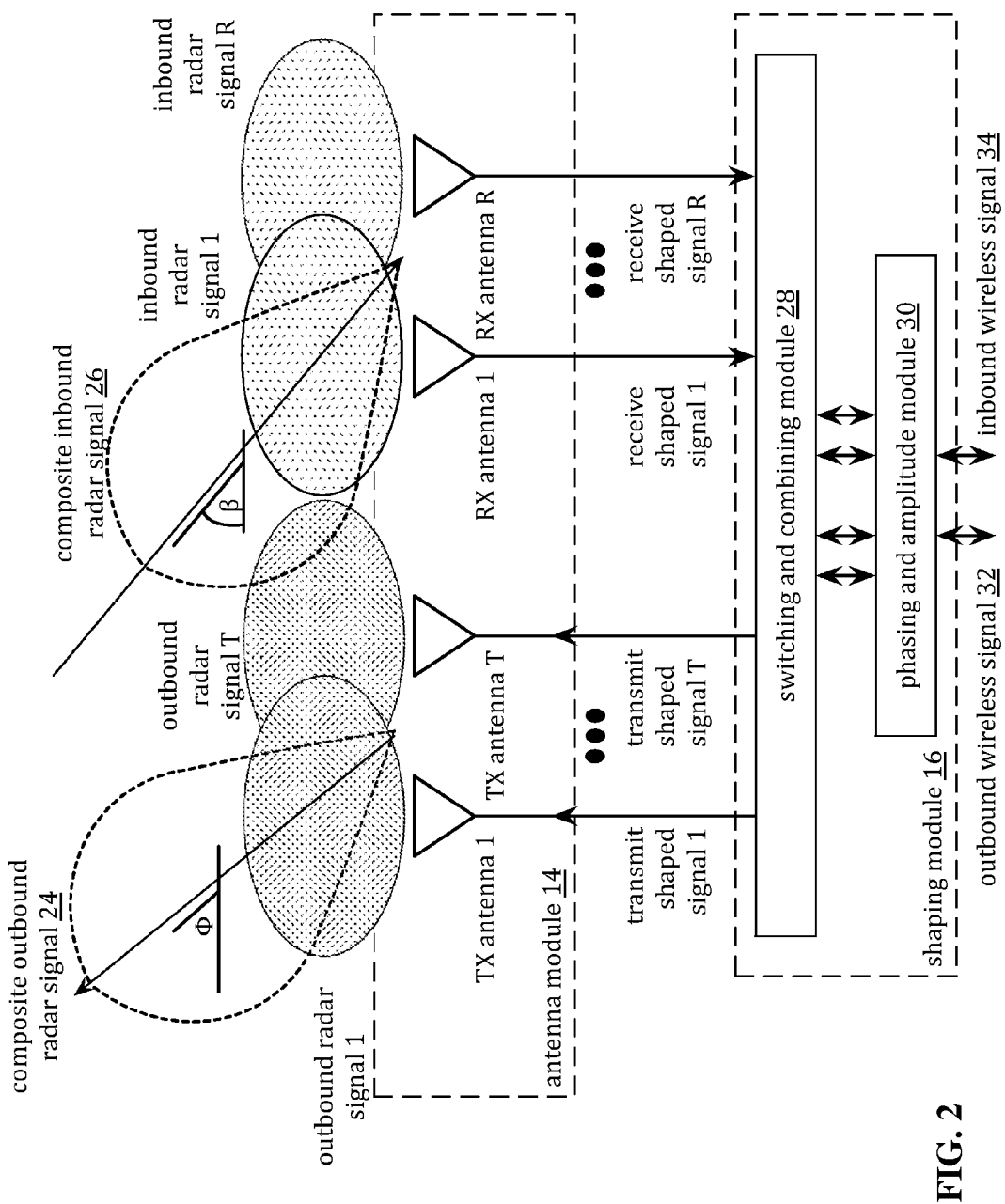
FIG. 2 is a schematic block diagram of an embodiment of an antenna module and a shaping module in accordance with the present invention.

FIG. 2 is a schematic block diagram of an embodiment of an antenna module 14 and a shaping module 16 that in combination produce a composite outbound radar signal 24 and capture a composite inbound radar signal 26. The antenna module 14 includes a plurality of transmit antennas 1-T and a plurality of receive antennas 1-R. The shaping module 16 includes a switching and combining module 28 and a phasing and amplitude module 30 that may operate in combination to adjust the phase and amplitude of signals passing through the shaping module 16.

The shaping module 16 manipulates the outbound wireless signal 32 from the transceiver to form a plurality of transmit shaped signals 1-T that are applied to TX antennas 1-T. The antenna module 14 forms the composite outbound radar signal 24 based on the outbound radar signals 1-T and the radiation patterns (e.g., shown in FIG. 2 as shaded ellipses) of each of the TX antennas 1-T. For example, the shaping module 16 outputs four transmit shaped signals 1-4 where each transmit shaped signal has a unique phase and amplitude compared to the other three. The antenna module forms a transmit beam (e.g., the composite outbound radar signal 24 at angle (D) when the TX antennas 1-4 are excited by the phase and amplitude manipulated transmit shaped signals 1-4. In another example, the shaping module 16 passes the outbound wireless signal 32 from the transceiver directly to a single TX antenna utilizing an omni-directional antenna pattern to illuminate at least a portion of the scanning area with the outbound radar signal.

The composite outbound radar signal 24 reflects off of the object in the scanning area and produces reflections that travel in a plurality of directions based on the geometric and material properties of the object. At least some of the reflections produce the inbound radar signal that propagates directly from the object to the RX antenna while other reflections further reflect off of other objects and then propagate to the RX antenna (e.g., multipath). The RX antenna(s) shape the received inbound signal in accordance with its radiation pattern to produce received shaped signals.

In particular, the antenna module 14 forms a composite inbound radar signal 26 based on the inbound radar signals 1-R and the antenna patterns (e.g., shown in FIG. 2 as shaded ellipses) of each of the RX antennas 1-R. For example, the antenna module 14 forms a receive antenna array with six RX antennas 1-6 to capture the inbound radar signals 1-6 that represent the composite inbound radar signal 26 to produce the receive shaped signals 1-6. Note that the antenna module 14 may be configured to provide a conventional antenna array, a reconfigurable antenna, a circular array, a leaky wave frequency steerable antenna, and/or a Fabry-Perot frequency steerable antenna.

The shaping module 16 receives and manipulates the received shaped signals 1-R from the RX antennas 1-R to form the inbound wireless signal 34 that is sent to the transceiver. For instance, the shaping module 16 receives six receive shaped signals 1-6 where each receive shaped signal has a unique phase and amplitude compared to the other five based on the direction of origin of the inbound radar signal and the antenna patterns of RX antennas 1-6. The shaping module 16 manipulates the phase and amplitude of the six receive shaped signals 1-6 to form the inbound wireless signal 34 such that the amplitude of the inbound wireless signal 34 will peak and/or the phase is an expected value when the receive antenna array (e.g., resulting from the operational parameters of the shaping module 16 and the six antenna patterns) is substantially aligned with the direction of the origin of inbound radar signal (e.g., at angle β). The transceiver module detects the peak and the processing module determines the direction of origin of the inbound radar signal.

The shaping module 16 may further receive new operational parameters from the transceiver and/or processing module to refine either or both of the transmit and receive beams to optimize the search for the object. For example, the transmit beam may be moved to raise the general signal level in a particular area of interest. The receive beam may be moved to refine the composite inbound radar signal 26 angle of arrival determination. Either or both of the transmit and receive beams may be moved to compensate for multipath reflections where such extra reflections are typically time delayed and of a lower amplitude than the inbound radar signal from the direct path from the object.

The switching and combining module 28 and the phasing and amplitude module 30 may be utilized in any order to manipulate signals passing through the shaping module 16. For example, the transmit shaped signal may be formed by phasing, amplitude adjustment, and then switching while the receive shaped signal may be combined, switched, phased, and amplitude adjusted.

Figures 3A, 3B:
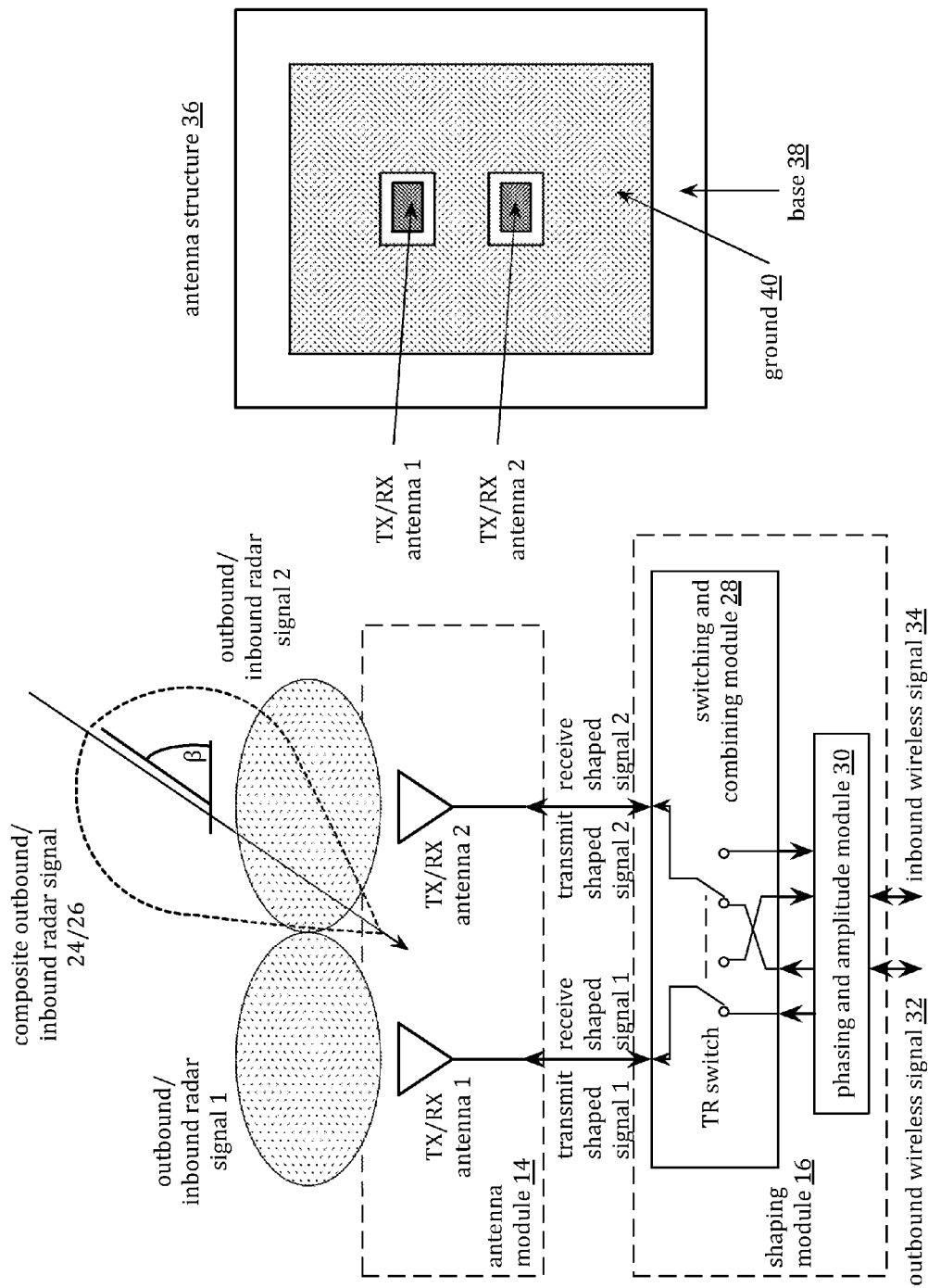
FIG. 3A is a schematic block diagram of another embodiment of an antenna module and a shaping module in accordance with the present invention.
FIG. 3B is a schematic block diagram of an embodiment of an antenna structure in accordance with the present invention.

FIG. 3A is a schematic block diagram of another embodiment of an antenna module 14 and a shaping module 16 where a pair of antennas TX/RX antenna 1 and TX/RX antenna 2 are shared for both transmit and receive operations and the shaping module 16 controls the utilization of the antenna pair. The shaping module 16 and antenna module 14 produce a composite outbound radar signal 24 and detect a composite inbound radar signal 26 at an angle β based on the shaping module 16 manipulation and the antenna patterns of the antennas (e.g., shown as shaded ellipses). The switching and combining module 28 includes a transmit-receive (TR) switch function to couple an antenna pair to the phasing and amplitude module 30 as a function of the radar device mode (e.g., transmitting a pulse or receiving the inbound radar signal). The TR switch function may be implemented with one or more of a relay, one or more transistors, and/or switching diodes.

In an example of operation, the phasing and amplitude module 30 produces the transmit shaped signal 1 and the transmit shaped signal 2 by phasing and amplitude adjusting the transmit shaped signals based on the outbound wireless signal 32 pulse and the operational parameters. The switching and combining module 28 utilizes the TR switch function to send transmit shaped signal 1 to TX/RX antenna 1 and transmit shaped signal 2 to TX/RX antenna 2. TX/RX antennas 1 and 2 produce outbound radar signals 1 and 2 based on their antenna patterns and the phasing and amplitude. The outbound radar signals 1 and 2 combine in-air to form the composite outbound radar signal 24 at angle θ. The outbound radar signal may reflect off an object to produce the inbound radar signal that impinges TX/RX antenna 1 as inbound radar signal 1 and impinges TX/RX antenna 2 as inbound radar signal 2.

The TX/RX antennas 1 and 2 produce receive shaped signals 1 and 2 based on the inbound radar signals 1 and 2 and the antenna patterns. The switching and combining module 28

TR switch function routes receive shaped signals 1 and 2 to the phasing and amplitude module 30. The phasing and amplitude module 30 manipulates the receive shaped signals 1 and 2 to produce the inbound wireless signal 34 in accordance with the operational parameters. The inbound wireless signal 34 may indicate a peak amplitude when the operational parameters align the receive beam direction (e.g., at angle β) with the direction of the origin of the inbound radar signal (e.g., where the object is located).

FIG. 3B is a schematic block diagram of an embodiment of an antenna structure 36 that includes a base 38, a ground 40, and a plurality of TX/RX antennas 1 and 2. The TX/RX antennas may be orientated vertically as shown, horizontally, diagonally, or in another configuration to form a composite antenna pattern when utilized along with the shaping module 16. The antenna orientation may be application dependent. For example, the vertically orientated antenna pair may be utilized in the radar device to determine elevation information of the player of the gaming console. In another example, the horizontally orientated antenna pair may be utilized in the radar device to determine azimuth information of the vehicle one lane over and in front of the radar system equipped vehicle.

The base 38 may be a printed circuit board, a common substrate of an integrated circuit (e.g., a package substrate or a die), and/or a common dielectric of an integrated circuit. The base 38 may support the antenna module 14 and at least a portion of the shaping module 16 (e.g., switching transistors of the switching and combining module 28). The ground 40 may be a metal area of the printed circuit board and/or integrated circuit. TX/RX antennas 1 and 2 may be traces on a printed circuit board and/or metal on an integrated circuit. For instance, some of the antenna structure may be implemented on the printed circuit board and another portion on the integrated circuit.

FIG. 4A is a schematic block diagram of another embodiment of an antenna module 14 that includes one or more TX antenna(s), and a plurality of RX antennas 1-4. The TX antenna may radiate the outbound radar signal 42 with an omni-directional antenna pattern within the scanning area based on the transmit shaped signal 44 and the radiation pattern of the TX antenna.

The reflection off of the object may produce the inbound radar signal which may impinge the RX antennas 1-4 as inbound radar signals 1-4. The antenna module 14 produces receive shaped signals 1-4 which may be utilized to detect elevation and azimuth (e.g., angle of arrival) to the object. Note that a radar system equipped with this configuration of the antenna module 14 is well suited to detect the distance and direction to the object. A corresponding antenna structure is discussed in greater detail with reference to FIG. 4B.

FIG. 4B is a schematic block diagram of another embodiment of an antenna structure 36 that includes a base 38, a ground 40, one or more TX antenna(s) 46, and a plurality of RX antennas 1-4. The base 38 may be a printed circuit board, a common substrate, or a common dielectric of an integrated circuit. The base 38 may support the antenna module 14 and at least a portion of the shaping module (e.g., switching transistors of the switching and combining module). The ground 40 may be a metal area of the printed circuit board or integrated circuit. The TX antenna 46 and RX antennas 1-4 may be traces on a printed circuit board or metal on an integrated circuit.

The RX antennas 1-4 may produce receive shaped signals 1-4 which may be utilized (e.g., analyzing phase, amplitude, timing) to detect elevation and azimuth (e.g., angle of arrival) to the object. The antenna patterns of RX antennas 1-4 are discussed in greater detail with reference to FIG. 4C.

FIG. 4C is a schematic block diagram of another embodiment of an antenna structure 36 that includes the base 38, the ground 40, one or more TX antenna(s) 46, and a plurality of RX antennas 1-4. The base 38 may be a printed circuit board, a common substrate, or a common dielectric of an integrated circuit. The base 38 may support the antenna module and at least a portion of the shaping module (e.g., switching transistors of the switching and combining module). The ground 40 may be a metal area of the printed circuit board or integrated circuit. The TX antenna 46 and RX antennas 1-4 may be traces on a printed circuit board or metal on an integrated circuit.

The RX antennas 1-4 may produce receive shaped signals 1-4 which may be utilized (e.g., analyzing phase, amplitude, timing) to detect elevation and azimuth (e.g., angle of arrival) to the object. The antenna patterns of RX antennas 1-4 are represented as radiation patterns P1-P4 where the reference is with respect to the TX antenna 46. Each radiation pattern P1-P4 may produce a unique representation of the inbound radar signal in terms of phase and amplitude.

FIG. 4D is a graphic representation of power and angle of arrival of another embodiment of an antenna structure where power (amplitude level) is plotted as a function of angle of arrival (AoA) of the inbound radar signal for radiation patterns P1-P4 of the antenna structure of FIG. 4C. The processing module may analyze the power levels detected from measurements of amplitude for each of the RX antennas 1-4 to determine the angle of arrival of the inbound radar signal utilizing the relationship depicted in the graphic representation of power and angle of arrival.

Figure 5:
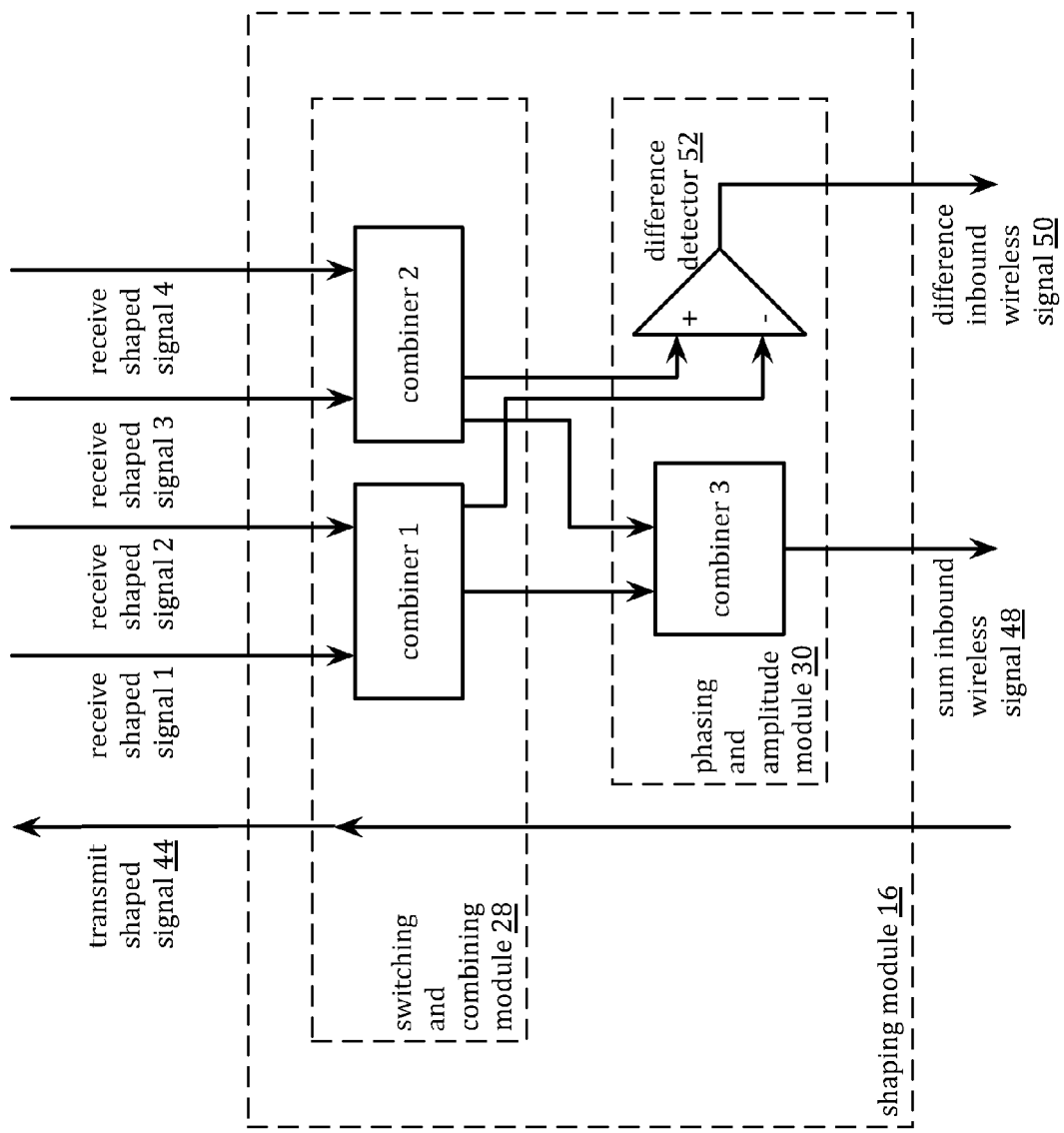
FIG. 5 is a schematic block diagram of another embodiment of a shaping module in accordance with the present invention.

FIG. 5 is a schematic block diagram of an embodiment of the shaping module 16 that includes a switching and combining module 28 and a phasing and amplitude module 30 configured to operate in combination with an antenna module utilizing one TX antenna and four RX antennas. The switching and combining module 28 may include a combiner 1 and a combiner 2 to combine received shaped signals. The phasing and amplitude module 30 may include a combiner 3 and a difference detector 52. In general, the shaping module 16 manipulates the receive shaped signals 1-4 from the four RX antennas with a sum and difference method to reveal location information of the object in the scanning area.

As a more specific example, the transceiver generates a mono-pulse as the outbound wireless signal 32 and sends it to the TX antenna. One or more of the RX antennas receives a reflection and/or refraction of the outbound wireless signal 32 as an inbound wireless signal. The RX antenna(s) shapes the inbound wireless signal based on its radiation pattern to produce the received shaped signals 1-4, which may have unique phase and/or amplitude characteristics representing the composite inbound radar signal.

Combiner 1 combines the received shaped signals 1 and 2, which are received from the RX antennas on a left portion of an antenna array, to produce a first combined signal. Combiner 2 combines the received shaped signals 3 and 4, which are received from the RX antennas on a right portion of an antenna array, to produce a second combined signal. In another example, combiner 1 combines the received shaped signals 1 and 4, which I received from the RX antennas on an upper portion of an antenna array, to produce the first combined signal. Combiner 2 combines the received shaped signals 2 and 3, which are received from the RX antennas on a lower portion of an antenna array, to produce the second combined signal.

Combiner 3 combines the outputs of combiner 1 and comber 2 to produce a sum inbound wireless signal 48. The difference detector 52 determines a difference between the outputs of combiner 1 and combiner 2 to produce a difference inbound wireless signal 50.

The processing module and/or transceiver divides the magnitude of the difference inbound wireless signal 50 by the magnitude of the sum inbound wireless signal to produce a position signal. The position signal may swing from negative to positive when the object (or antenna module) is moving past the center of the antenna array or when comparing reflected inbound radar signals from objects in one direction or another (e.g., a positive vs. negative angle of arrival from the center of the antenna array). For example, the processing module and/or transceiver analyzes the position signal for swing from positive to negative (or negative to positive) as the object moves from left to right in front of the antenna array when the receive shaped signals 1 and 2 are produced by RX antennas on the left portion of the antenna array and the receive shaped signals 3 and 4 are produced by RX antennas on the right portion of the antenna array.

In another example, the processing module and/or transceiver analyzes the position signal for a swing from positive to negative (or negative to positive) as the object moves from a higher elevation to a much lower elevation in front of the antenna array when the receive shaped signals 1 and 4 are produced by RX antennas on the upper portion of the antenna array and the receive shaped signals 2 and 3 are produced by RX antennas on the lower portion of the antenna array.

In yet another example, the processing module and/or transceiver analyzes the position signal produced the reflected inbound radar signals from stationary objects to detect their position by analyzing the sign and magnitude of the position signal. The processing module and/or transceiver may also analyze the magnitude of the sum inbound wireless signal 48 to improve the accuracy of the estimated location information. Note that, in the preceding examples, the sum and difference method has a desirable (lower) computational overhead in the transceiver and/or processing module since the shaping module 16 provides some level of pre-processing such that the analytics performed by the transceiver and/or the processing module primarily involve comparing magnitude rather than processing phase information.

Figure 6:
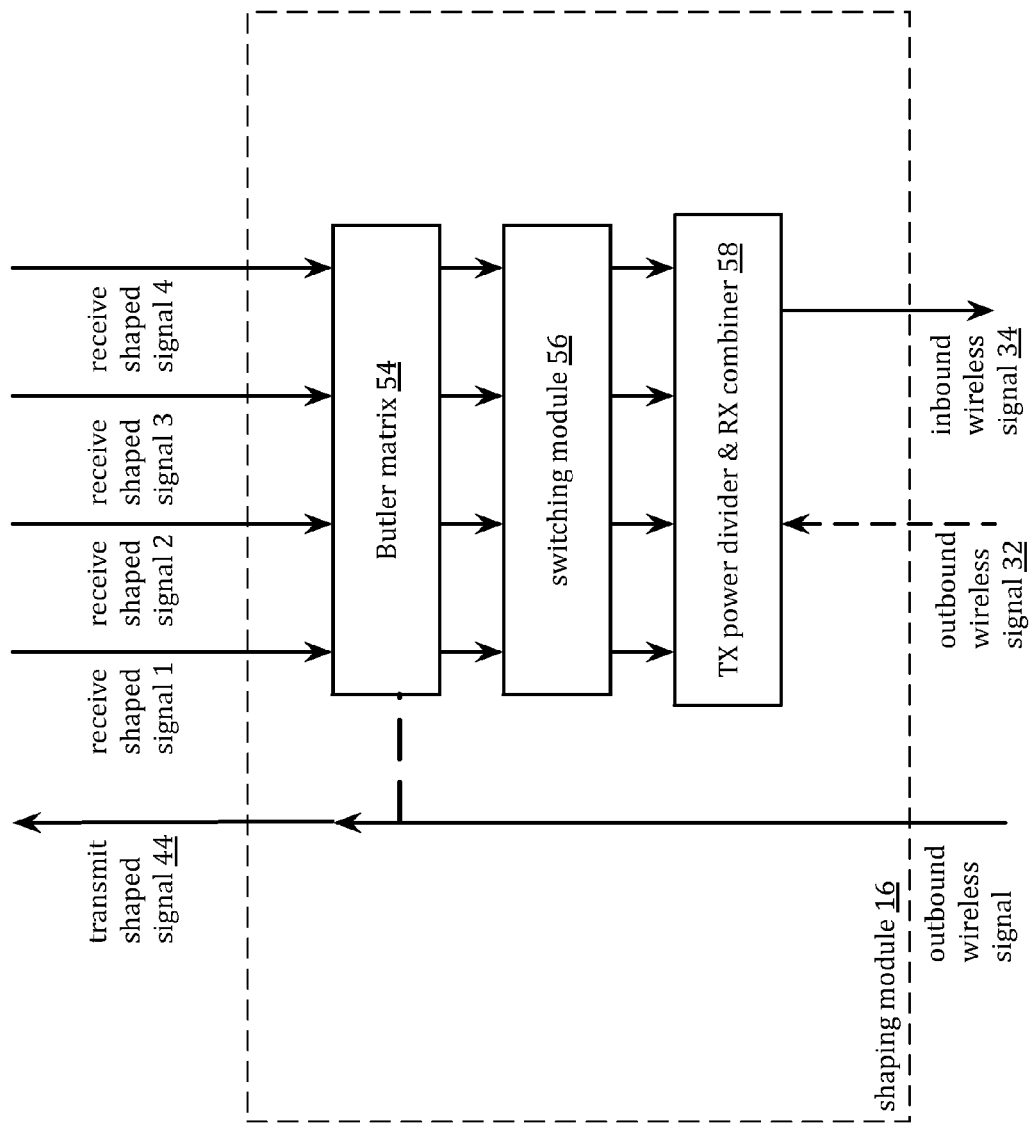
FIG. 6 is a schematic block diagram of another embodiment of a shaping module in accordance with the present invention.

FIG. 6 is a schematic block diagram of another embodiment of a shaping module 16 that includes a Butler matrix 54, a switching module 56, and a TX power divider and RX combiner 58. The shaping module 16 is configured to operate in combination with an antenna module utilizing one TX antenna and four RX antennas. The shaping module 16 manipulates the receive shaped signals 1-4 from the four RX antennas utilizing a Butler matrix 54 approach to reveal location information of the object in the scanning area.

The Butler matrix 54 may manipulate the phase and amplitude of the receive shaped signals 1-4 in accordance with the operational parameters. For example, the Butler matrix 54 may be configured so that the shaping module 16 creates a peak amplitude of the resulting inbound wireless signal 34 when the origin of the inbound radar signal is in a particular direction. In other words, the Butler matrix 54 may align the receive beam direction with the direction of the origin of the inbound radar signal. The Butler matrix 54 is discussed in greater detail with reference to FIG. 8.

The Butler matrix 54 outputs signals on one or more ports to the switching module 56. The switching module 56 routes the signals to the RX combiner 58 in accordance with the operational parameters. The RX combiner 58 further combines the signals to produce the inbound wireless signal 34 that may be utilized by the transceiver and/or processing module 58 to detect the object location.

In another example, the shaping module 16 receives the outbound wireless signal 32 at the TX power divider 58 and utilizes the Butler matrix 54 to send transmit shaped signals on a plurality of TX antennas (e.g., different TX and RX antennas or shared TX/RX antennas) to form a transmit beam. The TX power divider 58 provides different power levels to one or more ports to the switching module 56 in accordance with the operational parameters. The switching module 56 provides the power divided signals to the Butler matrix 54 on one or more ports in accordance with the operational parameters. The Butler matrix 54 manipulates the phase and amplitude of the signals to produce a plurality of transmit shaped signals 1-4 to energize the plurality of TX antennas 1-4 to produce the desired transmit beam for the composite outbound radar signal.

Figure 7:
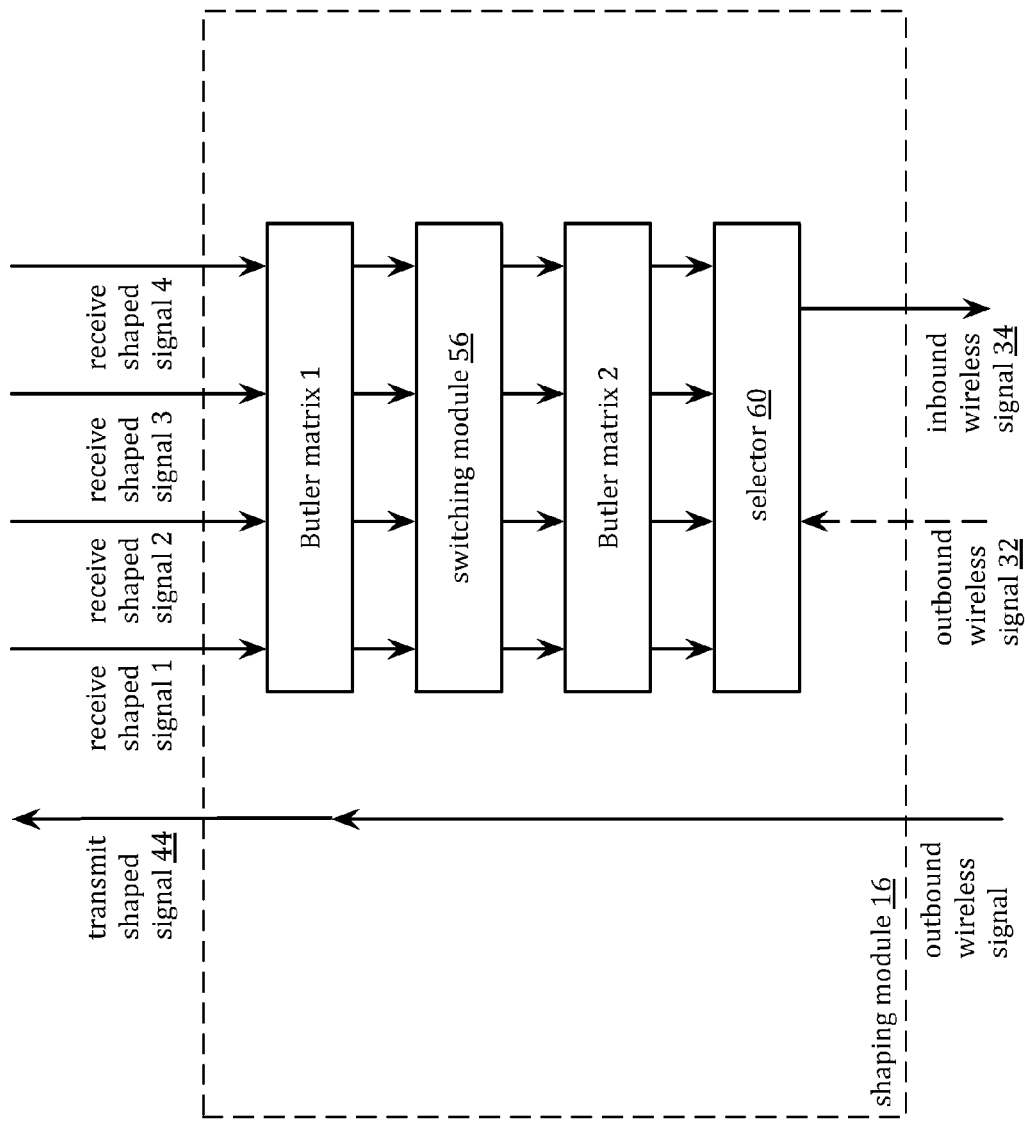
FIG. 7 is a schematic block diagram of another embodiment of a shaping module in accordance with the present invention.

FIG. 7 is a schematic block diagram of another embodiment of a shaping module 16 that includes a Butler matrix 1, a switching module 56, a Butler matrix 2, and a selector 60. The shaping module 16 is configured to operate in combination with an antenna module utilizing one TX antenna and four RX antennas. The shaping module 16 manipulates the received shaped signals 1-4 from the four RX antennas utilizing a two-stage Butler matrix approach to reveal location information of the object in the scanning area.

The Butler matrix 1 manipulates the phase and amplitude of the receive shaped signals 1-4 in accordance with the operational parameters. For example, the Butler matrix is configured so that the shaping module 16 creates a rough peak amplitude of the resulting inbound wireless signal 34 when the origin of the inbound radar signal is in a particular direction. In other words, the Butler matrix 1 \ substantially aligns the receive beam direction with the direction of the origin of the inbound radar signal.

The Butler matrix 1 outputs signals on one or more ports to the switching module 56. The switching module 56 routes the signals to the Butler matrix 2 in accordance with the operational parameters. The Butler matrix 2 further manipulates the phase and amplitude of the signals to create a fine peak amplitude detection capability. In other words, utilizing Butler matrix 1 and Butler matrix 2 in combination provides better angular resolution in comparison with using one Butler matrix. In another example, there are more Butler matrixes to provide further angular resolution.

The selector 60 selects the signal port for Butler matrix 2 to produce the inbound wireless signal 34 that is utilized by the transceiver and/or processing module to detect the object location. The selection of the port may be based on the operational parameters.

In another example, the shaping module 16 receives the outbound wireless signal 32 at the selector to utilize the Butler matrix pair to send transmit shaped signals on a plurality of TX antennas (e.g., different TX and RX antennas or shared TX/RX antennas) to form a transmit beam with better angular resolution. For instance, the selector 60 routes the outbound wireless signal 32 to one or more ports of the Butler matrix 2 in accordance with the operational parameters. The Butler matrix 2 manipulates the phase and amplitude of the outbound wireless signal to produce a plurality of preliminary transmit shaped signals. The switching module 56 provides the preliminary transmit shaped signals to the Butler matrix 1 on one or more ports in accordance with the operational parameters. The Butler matrix 1 manipulates the phase and amplitude of the preliminary transmit shaped signals to produce a plurality of transmit shaped signals 1-4 to energize the plurality of TX antennas 1-4 to produce the desired transmit beam for the composite outbound radar signal.

Figure 8:
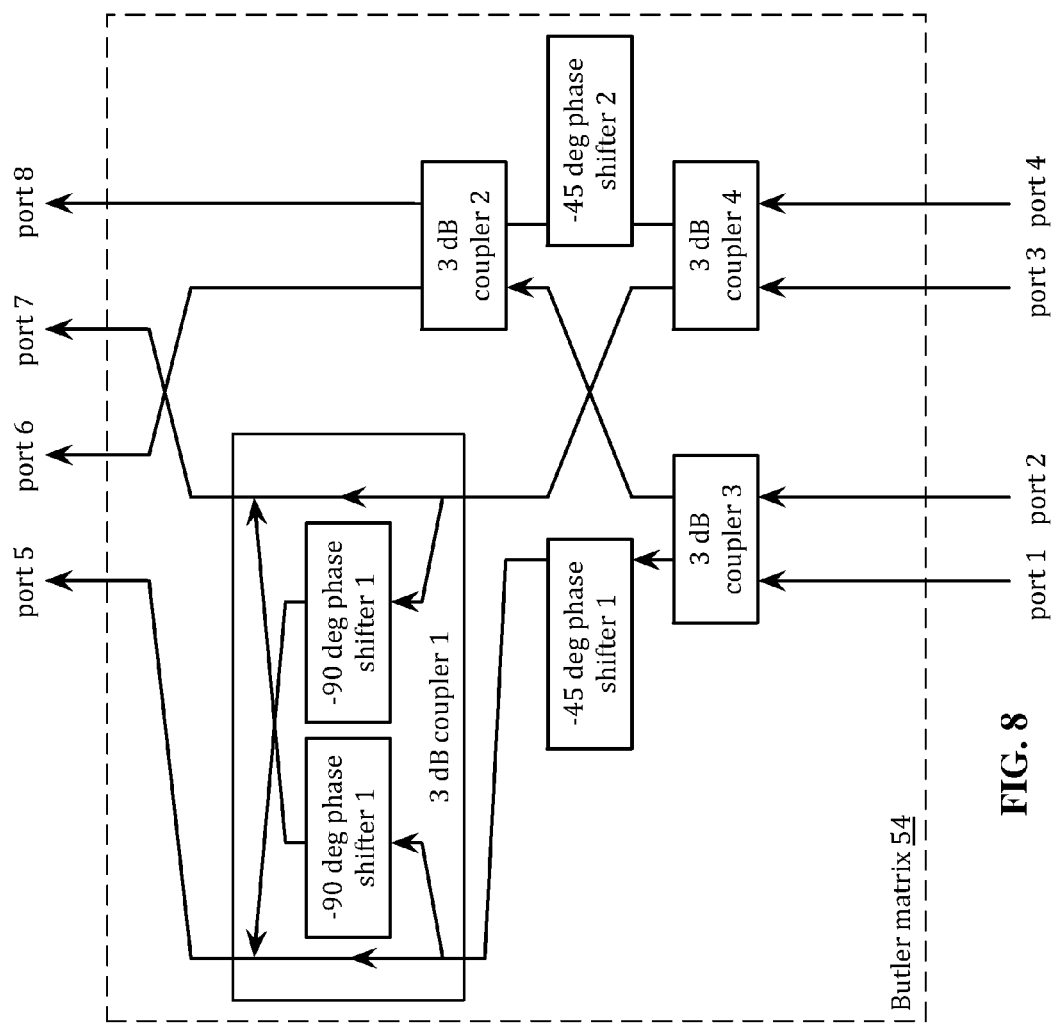
FIG. 8 is a schematic block diagram of an embodiment of a Butler matrix in accordance with the present invention.

FIG. 8 is a schematic block diagram of an embodiment of a Butler matrix 54 that includes a plurality of four 3 dB couplers, a plurality of −45 degree phase shifters, and a plurality of crossovers. The 3 dB couplers may be −90 degree directional phase-lag junctions where the power coming in is split (hence 3 dB) between the two outputs with no delay on one output and 90 degrees of delay on the other. The 4×4 butler matrix 54 is utilized to provide main beams in 45 degree increments.

For example, when port 1 is activated, then port 5 is shifted 45 degrees, port 6 by 90 degrees, port 7 by 135 degrees, and port 8 by 180 degrees. When port 2 is activated, then port 5 is shifted 135 degrees, port 6 by 0 degrees, port 7 by 225 degrees, and port 8 by 90 degrees. When port 3 is activated, then port 5 is shifted 90 degrees, port 6 by 225 degrees, port 7 by 0 degrees, and port 8 by 135 degrees. When port 4 is activated, then port 5 is shifted 180 degrees, port 6 by 135 degrees, port 7 by 90 degrees, and port 8 by 45 degrees. Note that, the Butler matrix 54 may be implemented on the same integrated circuit or printed circuit board as the antennas.

Figure 9:
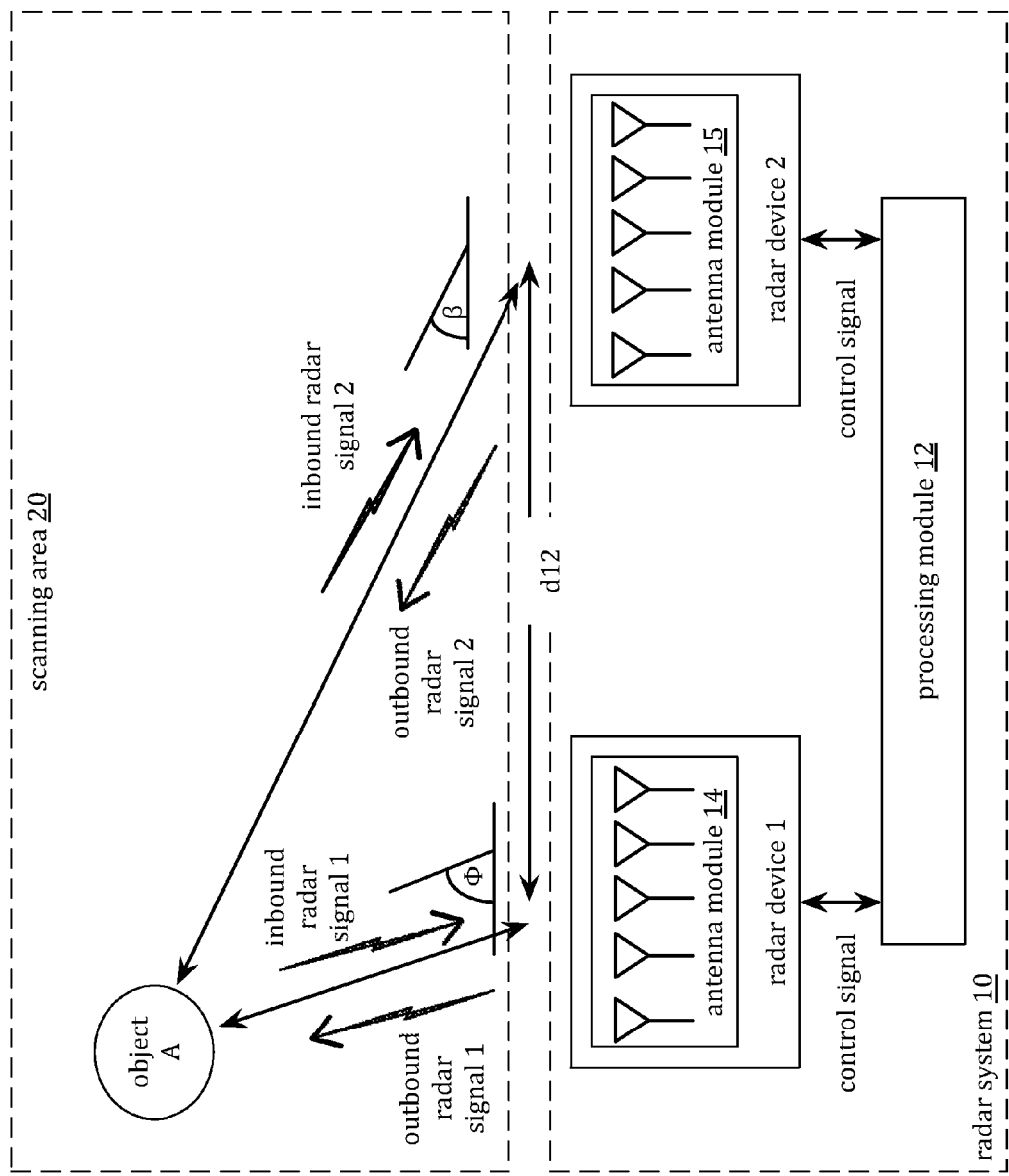
FIG. 9 is a schematic block diagram of another embodiment of a radar system in accordance with the present invention.

FIG. 9 is a schematic block diagram of another embodiment of a radar system 10 that includes a radar device 1, a radar device 2, and a processing module 12. The radar devices 1-2 are spaced apart a distance d12. Each radar device 1-2 detects object A and provides the processing module 12 with control signal information such that the processing module 12 can determine the location information of object A.

Each radar device 1-2 includes an antenna module 14-15 that utilizes a plurality of antennas to reveal the direction of the origin of the inbound radar signals. Radar device 1 transmits an outbound radar signal 1 into the scanning area 20 and receives an inbound radar signal 1 as a result of the radar signal reflection. Radar device 2 transmits an outbound radar signal 2 into the scanning area 20 and receives an inbound radar signal 2 as a result of the radar signal reflection. Each radar device also receives the radar signal reflection that results from the other radar device transmitting its radar signal.

The processing module 12 determines the angle of arrival $\Phi$ of the inbound radar signal 1 based on the received control signal from radar device 1 and/or from radar device 2. The processing module also determines the angle of arrival 13 of the inbound radar signal 2 based on the received control signal from radar device 2 and/or from radar device 1. The processing module 12 then determines the location information of object A based on the distance d12, the angle of arrival $\Phi$, and the angle of arrival $\beta$, wherein the distance d12 is determined based on a list (e.g., programmed) or by transmitting a pulse from one radar device to the other and calculating the distance d12.

Figure 10A:
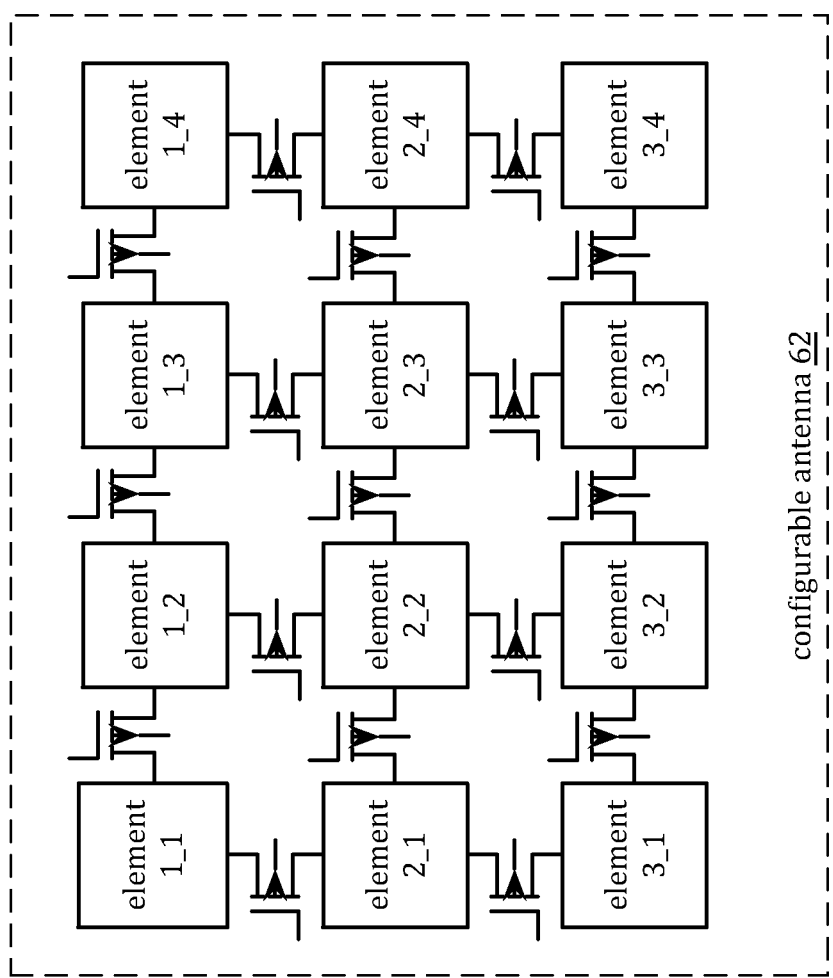
FIG. 10A is a schematic block diagram of an embodiment of a configurable antenna in accordance with the present invention.

FIG. 10A is a schematic block diagram of an embodiment of a configurable antenna 62 that includes a matrix of elements arranged in rows and columns interconnected by coupling transistors. For example: Elements 1_1 through 1_4 comprise row 1; Elements 2_1 through 2_4 comprise row 2; Elements 3_1 through 3_4 comprise row 3; Elements 1_1, 2_1, and 3_1 comprise column 1; Elements 1_2, 2_2, and 3_2 comprise column 2; Elements 1_3, 2_3, and 3_3 comprise column 3; and Elements 1_4, 2_4, and 3_4 comprise column 4.

The elements may comprise one or more of a trace on a printed circuit board (e.g., at one or more layers) and/or metal on an integrated circuit. The geometry of each element pattern may be a simple straight line, a square, a circle, a triangle, an ellipse, a meandering trace, a spiral, a helix, a patch, or any other pattern to radiate or capture a wireless signal. The elements and transistors may be formed on the same integrated circuit.

The transistors may couple elements together to form multi-element antennas of various shapes and resonant frequencies. For example, in one transistor activate scheme the transistors may be activated between elements 1_1 and 1_2, between 1_2 and 1_3, and between 1_3 and 1_4 to form a horizontally orientated antenna with a frequency commensurate with the wavelengths of those four elements. In another example, the transistors may be activated between elements 1_1 and 2_1, between 2_1 and 3_1 to form a vertically orientated antenna.

In an example, the configurable antenna 62 may form one or more antennas based on a transistor activation scheme. For example, the transistors may couple elements together to create antenna patterns that include a monopole, a dipole, a helix, a spiral, a patch and others utilizing the elements as antenna building blocks. Note that one or more of the elements may be utilized as a feed point for the configurable antenna 62. Examples of antenna pattern configurations are discussed in greater detail with reference to FIGS. 10B-10D.

In another example, the transistors provide amplification of the wireless signal in a distributed manner within the configurable antenna 62. In such a scenario, some of the elements may be fed with different amplitudes in accordance with the operational parameters. In yet another example, a transistor provides coupling of an element to ground to turn the element into a ground reference. The ability to activate an element as an antenna radiator, ground, or leave it isolated, a surface constructed of packed elements may be utilized to configure the antenna of FIG. 4B where one TX antenna is in the middle with four RX antennas separated by a ground plane. A feeding stripline may also be configured by coupling elements down a feeder path with parallel ground activated elements on both sides of the feeder path.

In a further example, at least some of the elements are surrounded by a ground layer yet are configurable via the transistors to form delay lines (e.g., many elements chain together in a compact area). The processing module may control the transistor activation scheme to form delay lines and couplers within the configurable antenna 62 structure this creating the building blocks of the shaping module discussed earlier. Such a configurable antenna 62 may be utilized to provide a directional antenna array that includes both the antenna module and shaping module functionality. The resulting antenna array is capable of rapid configuration at different operating frequencies and with varying directional antenna patterns.

Figure 10B:
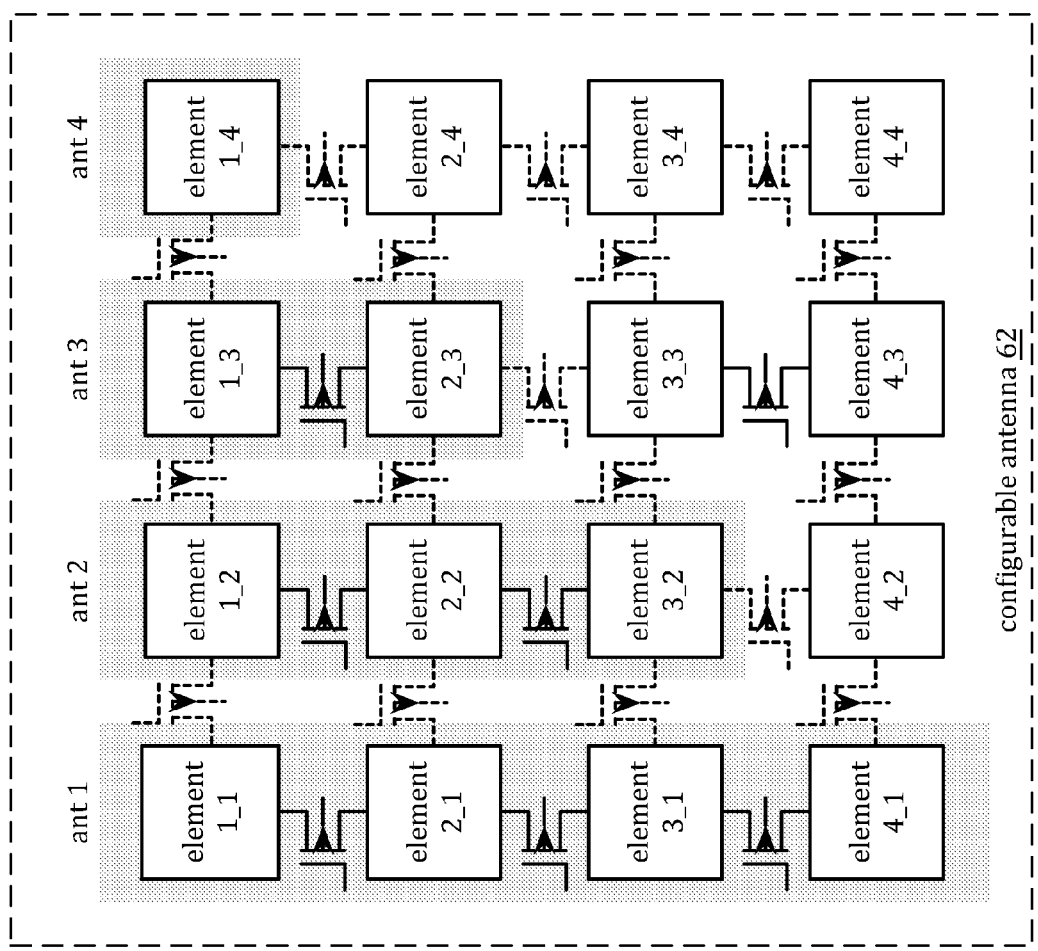
FIG. 10B is a schematic block diagram of another embodiment of a configurable antenna in accordance with the present invention.

FIG. 10B is a schematic block diagram of another embodiment of a configurable antenna 62 that includes a matrix of elements arranged in rows and columns interconnected by coupling transistors. The configurable antenna 62 may form a log periodic antenna pattern by the transistor activation scheme that enables parallel linked elements of different lengths.

Antenna 1 is formed by activating the transistors between elements 1_1 and 2_1, between elements 2_1 and 3_1, and between elements 3_1 and 4_1. Antenna 2 has a shorter wavelength and is formed by activating the transistors between elements 1_2 and 2_2 and between elements 2_2 and 3_2. Antenna 3 has an even shorter wavelength and is formed by activating the transistors between elements 1_3 and 2_3. Antenna 4 has an even shorter wavelength and is formed with elements 1_4. One or more of the antennas 1-4 may be activated with un-activated elements being parasitic. The diagram depicts the activated transistors as solid lines, inactive transistors as dashed lines, and antennas 1-4 as shaded areas.

Antennas 1-4 form a wide band log periodic antenna orientation in a right-left direction. Note that the transistors may be activated in a different fashion to form antennas 1-4 with rows of elements instead of columns. The resulting wide band log periodic antenna orientation is in a vertical direction. Further note, the electronic steering of the wide band log periodic antenna is accomplished by transistor activation that creates the antennas 1-4 in a desired orientation (e.g., diagonal, vertical, horizontal).

Figure 10C:
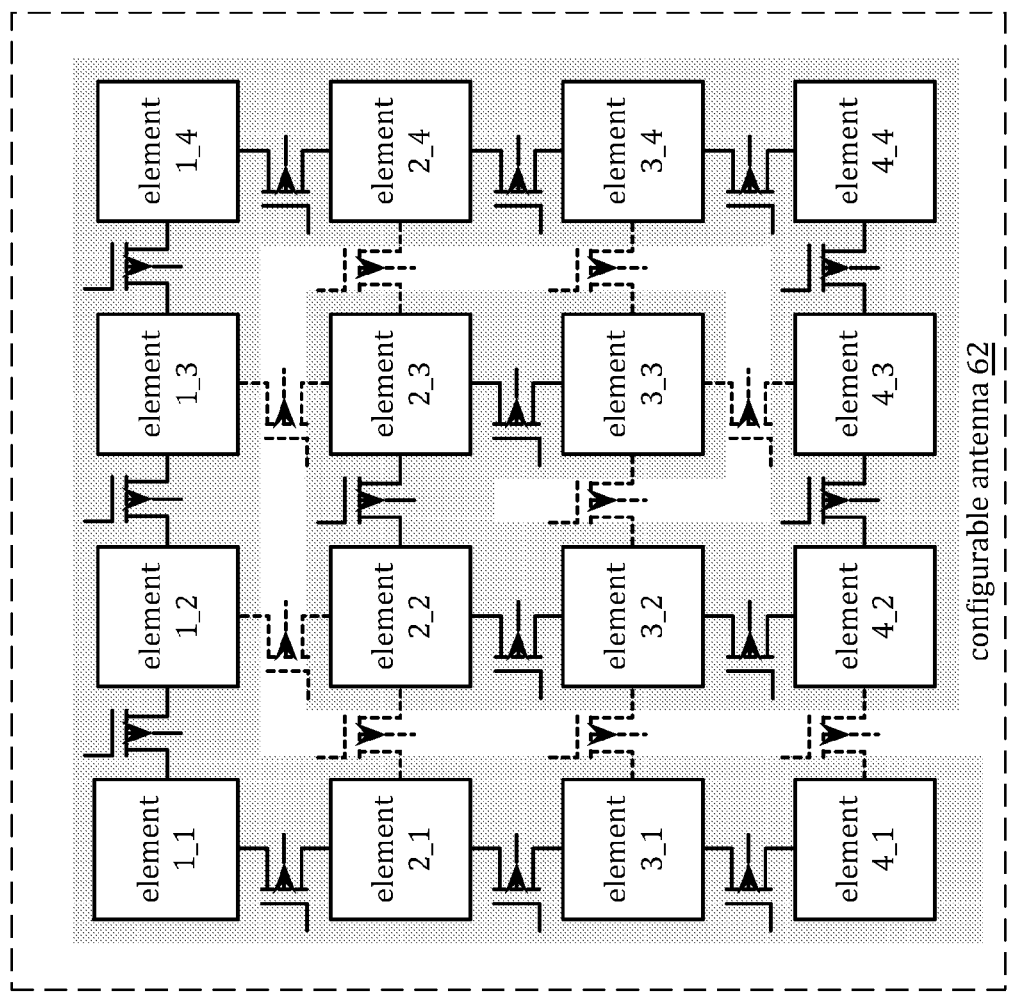
FIG. 10C is a schematic block diagram of another embodiment of a configurable antenna in accordance with the present invention.

FIG. 10C is a schematic block diagram of another embodiment of a configurable antenna 62 that includes a matrix of elements arranged in rows and columns interconnected by coupling transistors. The configurable antenna 62 may form a spiral antenna pattern by the transistor activation scheme that enables a chain of linked elements to create one longer wavelength antenna.

The spiral antenna is formed by activating the transistors between elements 4_1 and 3_1, between elements 3_1 and 2_1, between elements 2_1 and 1_1, between elements 1_1 and 1_2, between elements 1_2 and 1_3, between elements 1_3 and 1_4, between elements 1_4 and 2_4, between elements 2_4 and 3_4, between elements 3_4 and 4_4, between elements 4_4 and 4_3, between elements 4_3 and 4_2, between elements 4_2 and 3_2, between elements 3_2 and 2_2, between elements 2_2 and 2_3, and between elements 2_3 and 3_3. The diagram depicts the activated transistors as solid lines, inactive transistors as dashed lines, and the spiral antenna pattern as shaded areas. Note that the wavelength of the spiral antenna can be adjusted by adding or deleting antenna elements from the chain. Further note that the orientation may be clockwise as shown, or counter-clockwise by activating different transistors. The spiral antenna may be fed from either of the end elements 4_1 or 3_3.

Figure 10D:
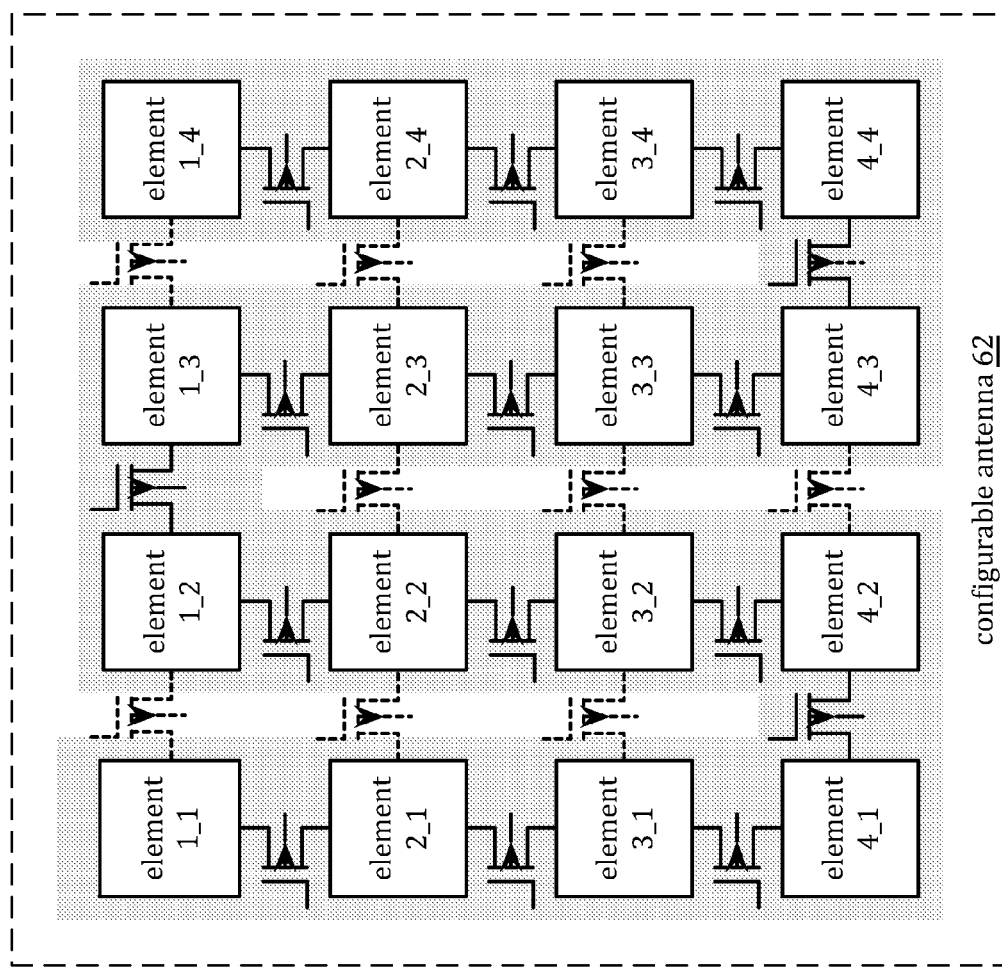
FIG. 10D is a schematic block diagram of another embodiment of a configurable antenna in accordance with the present invention.

FIG. 10D is a schematic block diagram of another embodiment of a configurable antenna 62 that includes a matrix of elements arranged in rows and columns interconnected by coupling transistors. The configurable antenna 62 may form a helix antenna pattern by the transistor activation scheme that enables a chain of linked elements to create one longer wavelength antenna.

The helix antenna is formed by activating the transistors between elements 1_1 and 2_1, between elements 2_1 and 3_1, between elements 3_1 and 4_1, between elements 4_1 and 4_2, between elements 4_2 and 3_2, between elements 3_2 and 2_2, between elements 2_2 and 1_2, between elements 1_2 and 1_3, between elements 1_3 and 2_3, between elements 2_3 and 3_3, between elements 3_3 and 4_3, between elements 4_3 and 4_4, between elements 4_4 and 3_4, between elements 3_4 and 2_4, and between elements 2_4 and 1_4. The diagram depicts the activated transistors as solid lines, inactive transistors as dashed lines, and the spiral antenna pattern as shaded areas. Note that the wavelength of the helix antenna can be adjusted by adding or deleting antenna elements from the chain. Further note that the path may be down, up, down, and back up as shown, or it may be right, left, right, and left by activating different transistors. The helix antenna may be fed from either of the end elements 1_1 or 1_4.

Figure 11:
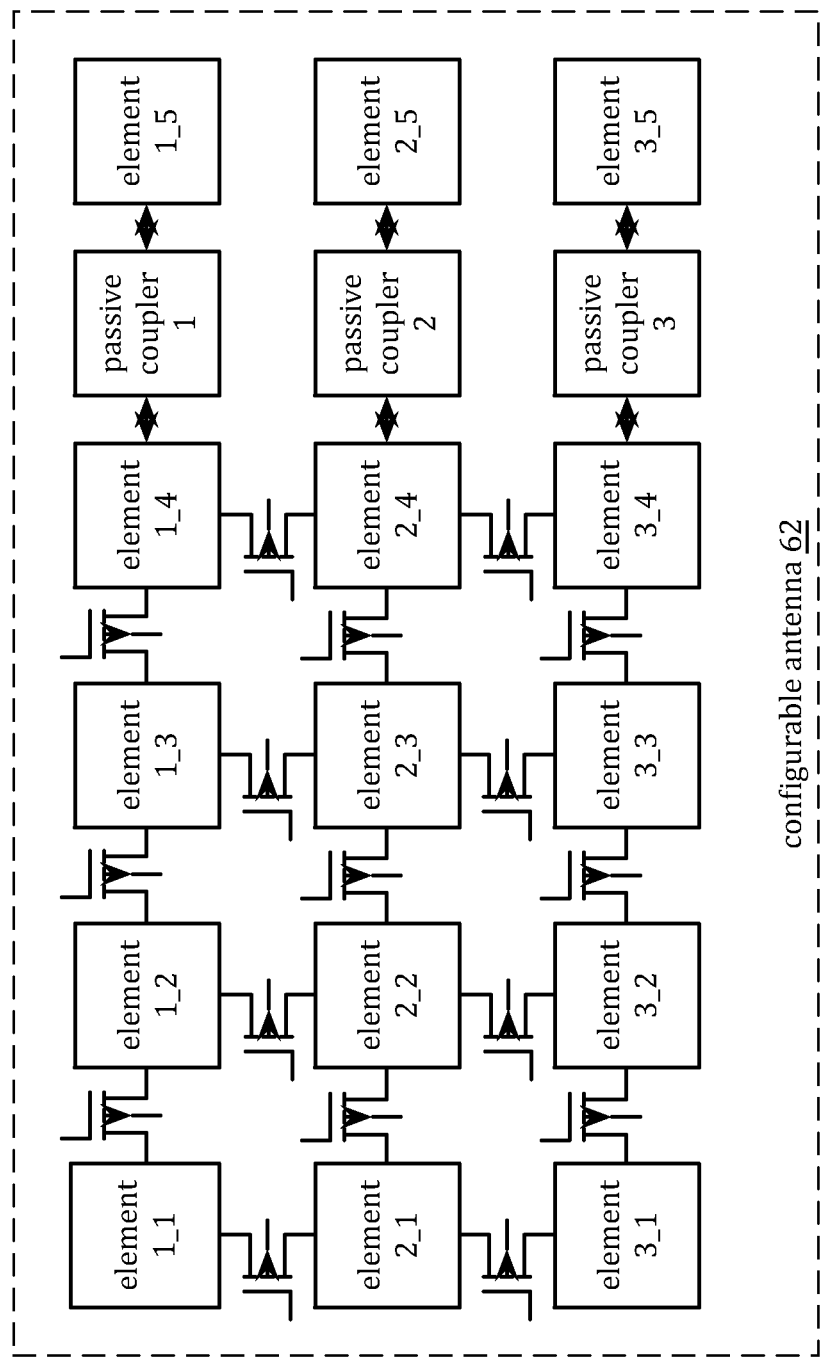
FIG. 11 is a schematic block diagram of another embodiment of a configurable antenna in accordance with the present invention.

FIG. 11 is a schematic block diagram of another embodiment of a configurable antenna 62 that includes a matrix of elements arranged in rows and columns interconnected by coupling transistors where at least some of the elements interconnected by transistors are operably coupled to a plurality of elements that are interconnected by a plurality of passive couplers. The configurable antenna 62 may form a plurality of antenna patterns by the transistor activation scheme that enables a chain of linked elements to create one longer wavelength antenna.

Elements 1_1 through 1_4, 2_1 through 2_3, and 3_1 through 3_3 may be interconnected by transistors. Element 1_4 may be coupled to element 1_5 via passive coupler 1. Element 2_4 may be coupled to element 2_5 via passive coupler 2. Element 3_4 may be coupled to element 3_5 via passive coupler 3.

The passive couplers may serve as bandpass, notch, low pass, or high pass wireless filters. For example, when passive coupler 1 is a bandpass filter at 900 MHz, element 1_4 is fed to operate at 2.4 GHz (e.g., the resonant frequency of element 1_4) no energy passes to element 1_5. When element 1_4 is fed to operate at 900 MHz, the energy does pass to element 1_5 such that elements 1_4 and 1_5 together resonate at 900 MHz. Feeding element 1_4 alone with 900 MHz or 2.4 GHz with form an antenna that will resonate at either frequency. A still lower frequency of operation is obtained when the transistors between elements 1_1 through 1_4 are activated thus forming an antenna utilizing elements 1_1 through 1_5 (e.g., 700 MHz).

In another example, passive couplers may be utilized to link elements only linked by passive couplers to further extend the multi-band operation of the configurable antenna 62. For example, a passive coupler between element 1_5 and element 2_5 may provide a still lower resonate frequency of operation when elements 1_1 through 1_5 are coupled to element 2_5 (e.g., 500 MHz, 700 MHz, 900 MHz, and 2.4 GHz)

Figure 12:
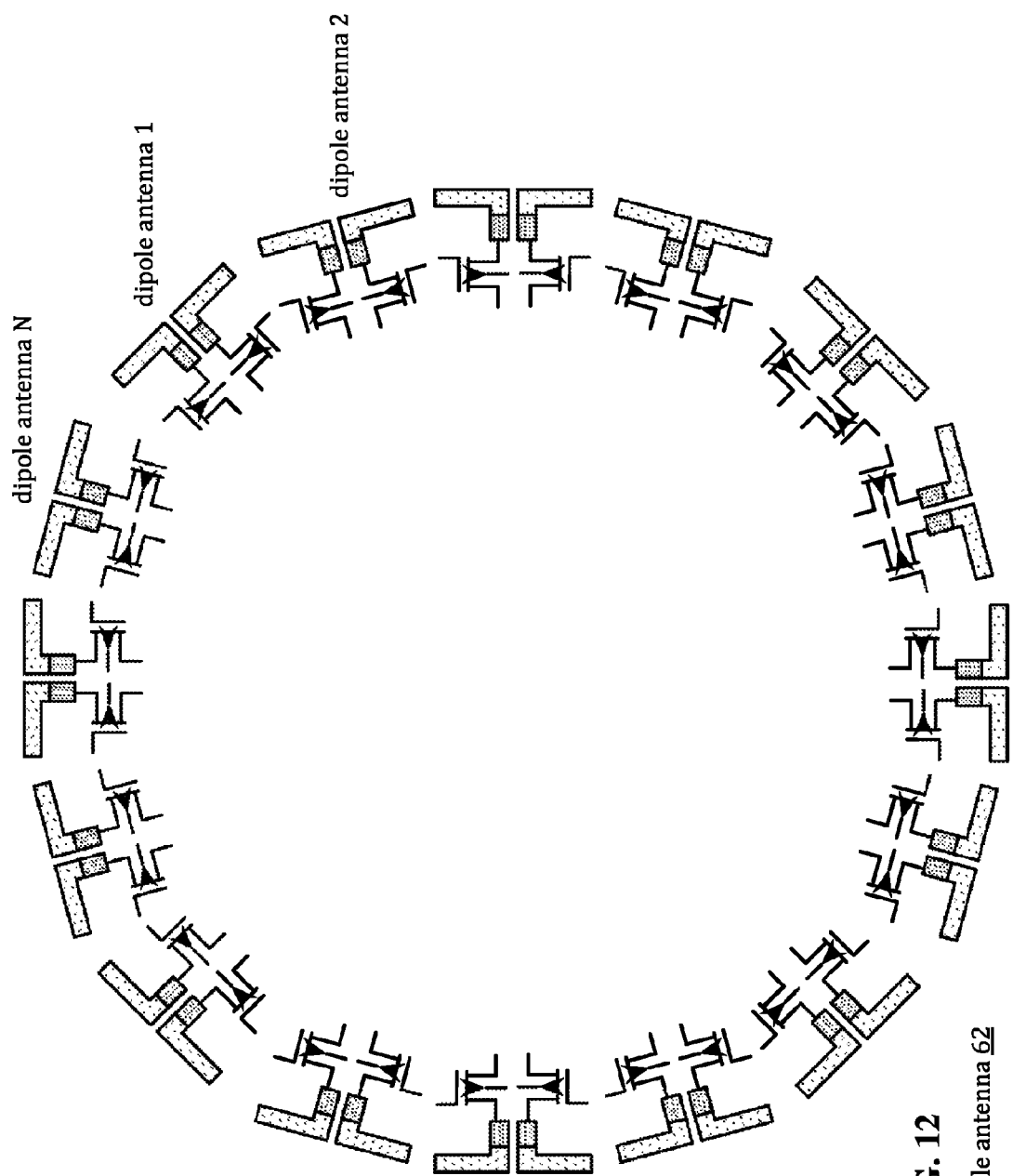
FIG. 12 is a schematic block diagram of another embodiment of a configurable antenna in accordance with the present invention.

FIG. 12 is a schematic block diagram of another embodiment of a configurable antenna 62 that includes a plurality of dipole antennas 1-N configured as a circular antenna. Each of the dipole antennas 1-N may be configured and/or activated with one or more transistors configured in a transistor activation scheme.

The dipole antennas 1-N may be formed with elements as previously discussed where the orientation and resonant frequency may be configured by a transistor activation scheme between elements. When coupled with shaping module functionality, the circular antenna may be phased to send and receive beams in substantially any direction from the circle. The elements and transistors may be formed on the same integrated circuit.

In an example, the transistors provide amplification of the wireless signal in a distributed manner within the configurable antenna 62. In such a scenario, some of the elements may be fed with different amplitudes in accordance with the operational parameters.

Figure 13:
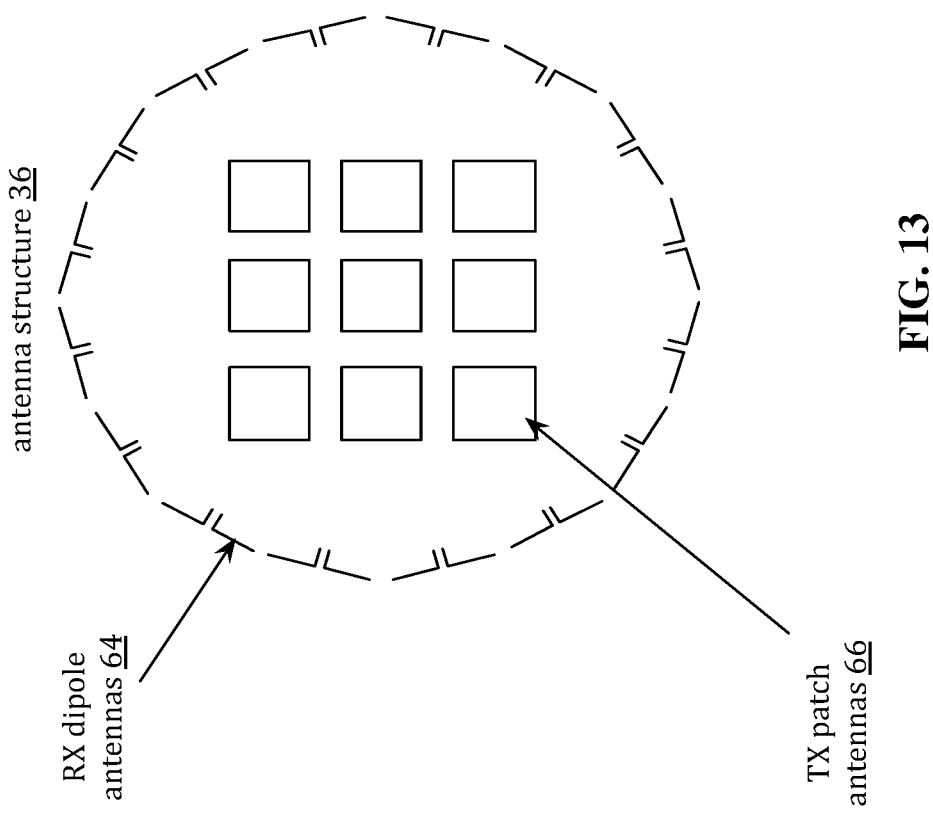
FIG. 13 is a schematic block diagram of another embodiment of an antenna structure in accordance with the present invention.

FIG. 13 is a schematic block diagram of another embodiment of an antenna structure 36 that includes the plurality of dipole antennas 64 configured as a circular antenna encircling a plurality of patch antennas 66. Each of the dipole antennas 64 may be configured and/or activated with one or more transistors configured in a transistor activation scheme. Each of the patch antennas 66 may be configured and/or activated with one or more transistors configured in a transistor activation scheme.

The dipole antennas 64 may be formed with elements as previously discussed where the orientation and resonant frequency may be configured by a transistor activation scheme between elements. When coupled with shaping module functionality, the circular antenna may be phased to send and receive beams in substantially any direction from the circle.

The patch antennas 66 may be formed with elements as previously discussed where the orientation and resonant frequency may be configured by a transistor activation scheme between elements. When coupled with shaping module functionality, the patch antennas may be phased to send and receive beams in substantially any direction.

The elements and transistors of the circular antenna and the plurality of patch antennas 66 may be formed on the same integrated circuit. In an example of operation, the circular antenna is utilized to form a receive beam and the plurality of patch antennas 66 is utilized to form a transmit beam to enable duplex operation. In another example of operation, the circular antenna is utilized to form the transmit beam and the plurality of patch antennas 66 is utilized to form the receive beam to enable duplex operation.

In another example, the transistors provide amplification of the wireless signal in a distributed manner within the antenna structure. In such a scenario, some of the elements may be fed with different amplitudes in accordance with the operational parameters.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated radar system comprising:
   a plurality of radar devices configured to operate as a system to scan an area covered by the plurality of radar devices, in which a respective radar device of the plurality of radar devices includes:
   an antenna module configured to have a plurality of antennas to generate a shaped pattern for transmitting an outgoing radar signal and for receiving a reflected signal of the outgoing radar signal from an object located in the area;
   a shaping module configured to operate with the antenna module to shape outgoing transmission signals for transmission from the plurality of antennas, wherein the shaping module shapes the outgoing transmission signals as shaped transmission signals to generate the shaped pattern of the outgoing radar signal from the plurality of antennas and the shaping module to also adjust shaping of the reflected signal received via the shaped pattern for the plurality of antennas; and
   a transceiver configured to generate the outgoing transmission signals to the shaping module and to receive the reflected signal that is shape adjusted from the shaping module; and
   a processing module coupled to the plurality of radar devices to generate individual control signals to corresponding transceivers of the radar devices to generate corresponding outgoing transmission signals and to receive corresponding reflected signals that are shape adjusted from the corresponding transceivers of the radar devices, and in which the processing module is configured to process the corresponding reflected signals from transceivers of the plurality of radar devices to determine a location of the object in the area being scanned by the plurality of radar devices.

2. The integrated radar system of claim 1, wherein the outgoing transmission signal from a particular one of the radar devices includes a time stamp information and wherein the time stamp information present in the reflected signal is utilized with an angle of reception of the reflected signal at the plurality of antennas of the particular one of the radar devices to determine the location of the object.

3. The integrated radar system of claim 1, wherein the location of the object is determined by determining a first angle of reception of the reflected signal at the plurality of antennas of a first of the radar devices, a second angle of reception of the reflected signal at the plurality of antennas of a second of the radar devices, and utilizing a difference in the first and second angles of reception, along with a distance separation of the respective plurality of antennas of a first and second radar devices to identify the location of the object.

4. The integrated radar system of claim 1, wherein respective radar devices of the plurality of radar devices scan entirely over the area.

5. The integrated radar system of claim 1, wherein respective radar devices of the plurality of radar devices scan over portions of the area, wherein one or more portions overlap.

6. The integrated radar system of claim 1, wherein respective radar devices of the plurality of radar devices scan over unique portions of the area, wherein none of the portions overlap.

7. The integrated radar system of claim 1, wherein the radar devices transmit corresponding radar signals in the approximate range of 30 MHz to 300 GHz.

8. The integrated radar system of claim 1, wherein the radar devices transmit corresponding radar signals in a 60 GHz band.

9. The integrated radar system of claim 1, wherein the radar devices are configured to locate a gaming object.

10. The integrated radar system of claim 1, wherein the radar devices are configured to locate a vehicle.

11. The integrated radar system of claim 1, wherein the shaping module provides signal shaping by adjusting phase and amplitude of the outgoing transmission signals and the received reflected signals.

12. The integrated radar system of claim 11, wherein the shaping module is configured to utilize a Butler matrix to manipulate phase and amplitude of the received reflected signals.

13. The integrated radar system of claim 1, wherein the plurality of antennas for respective radar devices are configured as phase array antennas.

14. The integrated radar system of claim 1, wherein the shaped pattern of the outgoing radar signal is directed in a beam in a particular direction.

15. An integrated radar system comprising:
a plurality of radar devices configured to operate as a system to scan an area covered by the plurality of radar devices, in which a respective radar device of the plurality of radar devices includes:
an antenna module configured to have one or more antennas to transmit an omni-directional outgoing radar signal and a plurality of antennas to establish a shaped pattern for receiving a reflected signal of the outgoing radar signal from an object located in the area;
a shaping module configured to operate with the antenna module to adjust shaping of the reflected signal received via the shaped pattern of the plurality of antennas; and
a transceiver configured to generate an outgoing transmission signal to the antenna module to generate the outgoing radar signal and to receive the reflected signal that is shape adjusted from the shaping module; and
a processing module coupled to the plurality of radar devices to generate individual control signals to corresponding transceivers of the radar devices to generate corresponding outgoing transmission signals and to receive corresponding reflected signals that are shape adjusted from the corresponding transceivers of the radar devices, and in which the processing module is configured to process the corresponding reflected signals from transceivers of the plurality of radar devices to determine a location of the object in the area being scanned by the plurality of radar devices.

16. The integrated radar system of claim 15, wherein the outgoing transmission signal from a particular one of the radar devices includes a time stamp information and wherein the time stamp information present in the reflected signal is utilized with an angle of reception of the reflected signal at the plurality of antennas of the particular one of the radar devices is used to determine the location of the object.

17. The integrated radar system of claim 15, wherein the location of the object is determined by determining a first angle of reception of the reflected signal at the plurality of antennas of a first of the radar devices, a second angle of reception of the reflected signal at the plurality of antennas of a second of the radar devices, and utilizing a difference in the first and second angles of reception, along with a distance separation of the respective plurality of antennas of the first and second radar devices to identify the location of the object.

18. A method of locating an object by use of an integrated radar system comprising:
transmitting corresponding outgoing radar signals from a plurality of radar devices configured to operate as a system to scan an area covered by the plurality of radar devices, in which a respective radar device of the plurality of radar devices is configured to scan separately from other radar devices;
for a respective radar device of the plurality of radar devices:
receiving a control signal to generate an outgoing transmission signals from a transceiver;
shaping the outgoing transmission signals into shaped signals;
coupling the shaped signals to a plurality of antennas to generate a shaped pattern for transmitting an outgoing radar signal from the plurality of antennas;
receiving a reflected signal of the outgoing radar signal from an object located in the area by the plurality of antennas;
adjusting shape of the reflected signal received via the shaped pattern for the plurality of antennas; and
receiving the reflected signal that is shape adjusted at the transceiver; and
processing corresponding reflected signals that are shape adjusted from the corresponding transceivers of the radar devices to determine a location of the object in the area being scanned by the plurality of radar devices.

19. The method of claim 18, further including providing a time stamp information for the outgoing transmission signal from a particular one of the radar devices and utilizing the time stamp information present in the reflected signal with an angle of reception of the reflected signal at the plurality of antennas of the particular one of the radar devices to determine the location of the object.

20. The method of claim 18, further including determining a first angle of reception of the reflected signal at the plurality of antennas of a first of the radar devices, determining a second angle of reception of the reflected signal at the plurality of antennas of a second of the radar devices, and utilizing a difference in the first and second angles of reception, along with a distance separation of the respective plurality of antennas of the first and second radar devices to identify the location of the object.

* * * * *